(12) United States Patent
Grumer et al.

(10) Patent No.: US 10,743,081 B2
(45) Date of Patent: Aug. 11, 2020

(54) PARENTAL CONTROLS

(71) Applicant: OpenTV, Inc., San Francisco, CA (US)

(72) Inventors: Ran Grumer, Sunnyvale, CA (US); Alexander Fishman, San Francisco, CA (US); Eunsook An, San Francisco, CA (US); Danielle Maslow Zimmerman, East Palo Alto, CA (US); Crx K. Chai, Oakland, CA (US); Colin Shengcai Zhao, Sunnyvale, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 16/125,367

(22) Filed: Sep. 7, 2018

(65) Prior Publication Data

US 2019/0082229 A1 Mar. 14, 2019

Related U.S. Application Data

(60) Provisional application No. 62/556,416, filed on Sep. 9, 2017, provisional application No. 62/580,939, filed on Nov. 2, 2017.

(51) Int. Cl.
*H04N 7/16* (2011.01)
*H04N 21/6334* (2011.01)
*H04N 21/466* (2011.01)
*H04N 21/454* (2011.01)
*H04N 21/45* (2011.01)
(Continued)

(52) U.S. Cl.
CPC ..... *H04N 21/6334* (2013.01); *H04N 21/2393* (2013.01); *H04N 21/25866* (2013.01); *H04N 21/454* (2013.01); *H04N 21/4532* (2013.01); *H04N 21/4668* (2013.01);
(Continued)

(58) Field of Classification Search
CPC . H04N 21/4532; H04N 21/6334; H04N 21/83
See application file for complete search history.

(56) References Cited

U.S. PATENT DOCUMENTS 7,836,192 B2 * 11/2010 Johnson ................ A63F 13/10
709/229
9,065,824 B1 * 6/2015 Valdivia .............. H04L 63/0884
(Continued)

OTHER PUBLICATIONS

U.S. Appl. No. 62/556,416, filed Sep. 9, 2017, Parental Controls.
(Continued)

*Primary Examiner* — Gigi L Dubasky
(74) *Attorney, Agent, or Firm* — Schwegman Lundberg & Woessner, P.A.

(57) ABSTRACT

A method includes associating a client device with a secondary device. The method further includes identifying a triggering event related to an operation of the secondary device. The method also includes, in response to identifying the triggering event, sending a message to the client device with a request for information related to the operation of the secondary device. The client device may have a user interface configured to receive the information. The method includes receiving, via a network, the information from the client device. The method further includes performing the operation at the secondary device using the information from the client device.

20 Claims, 28 Drawing Sheets

(51) Int. Cl.
*H04N 21/482* (2011.01)
*H04N 21/239* (2011.01)
*H04N 21/475* (2011.01)
*H04N 21/258* (2011.01)

(52) U.S. Cl.
CPC ..... *H04N 21/4751* (2013.01); *H04N 21/4753* (2013.01); *H04N 21/482* (2013.01)

(56) References Cited

U.S. PATENT DOCUMENTS

| | | | |
|---|---|---|---|
| 2011/0030000 A1* | 2/2011 | Tojima | G08C 17/00 725/28 |
| 2015/0128184 A1* | 5/2015 | Tai | H04N 21/4314 725/46 |
| 2016/0191428 A1* | 6/2016 | Vieira | H04W 12/08 709/206 |
| 2017/0228550 A1* | 8/2017 | Harb | H04N 21/436 |
| 2019/0124272 A1* | 4/2019 | O'Neill | H04N 5/23293 |

OTHER PUBLICATIONS

U.S. Appl. No. 62/580,939, filed Nov. 2, 2017, Parental Controls.
Cipriani, Jason, "Hands-on with Google Family Link: The best parental control service yet", [Online]. Retreived from the Internet:,URL: https:www.zdnet.com article hands-on-with-google-family-link-the-best-parental-control-service-yet , (Mar. 30, 2017), 6 pages.

* cited by examiner

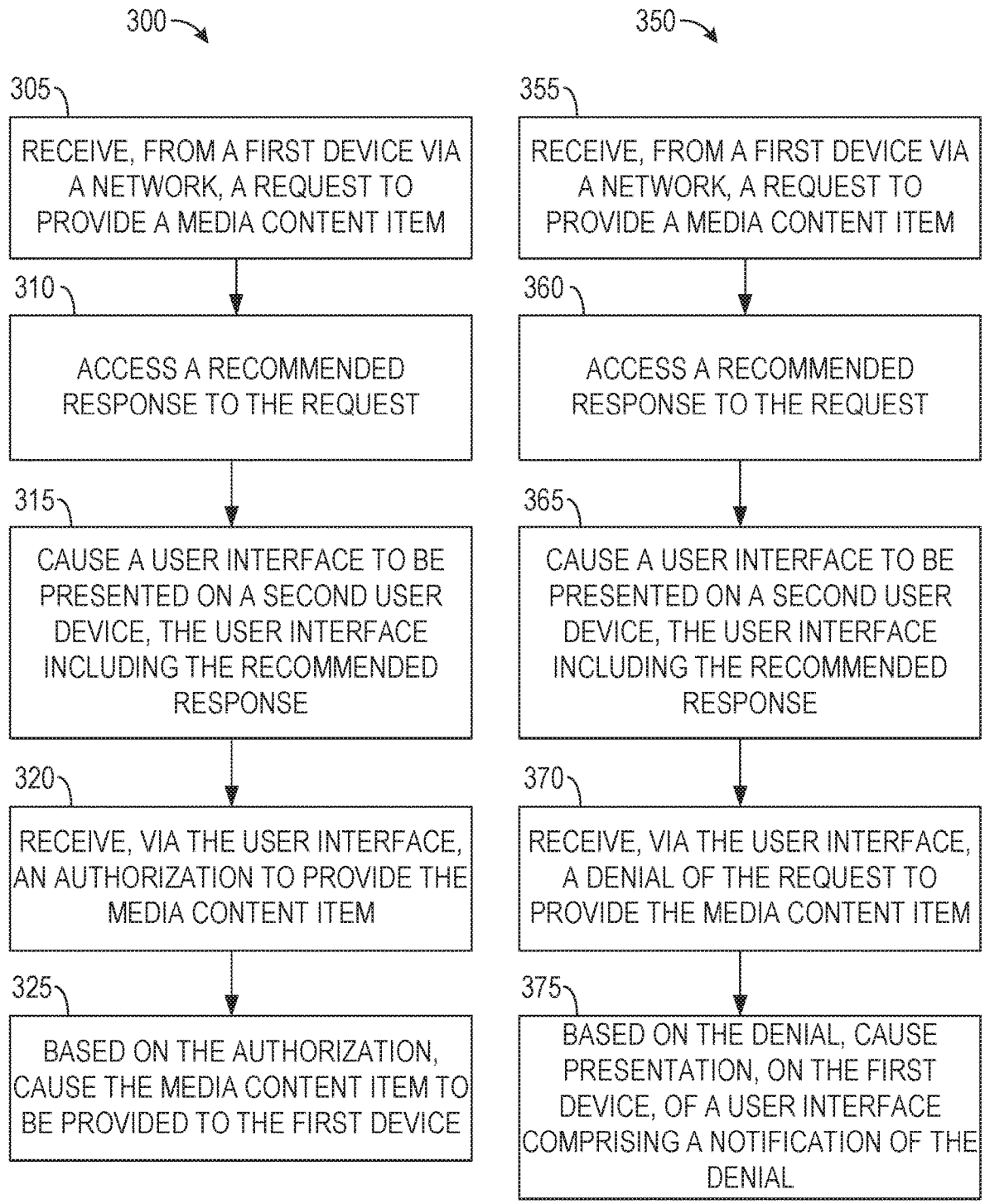

400

405 ACCOUNT TABLE

| ACCOUNT ID | PARENT ID | NAME | AGE |
|---|---|---|---|
| 101 | NULL | PAUL | 38 |
| 102 | 101 | LETO | 17 |
| 103 | 101 | JESSICA | 6 |

420 VIEWING HISTORY TABLE

| ACCOUNT ID | TIMESTAMP | ITEM ID | DURATION |
|---|---|---|---|
| 102 | 9/1/2018 17:53:27 | 9901 | 0:45:00 |
| 102 | 9/2/2018 17:42:18 | 9902 | 1:30:07 |
| 103 | 9/3/2018 11:53:27 | 9901 | 0:31:45 |

435 ITEM TABLE

| ITEM ID | TITLE | KEYWORDS | RATING |
|---|---|---|---|
| 9901 | HEAT | MICHAEL MANN, AL PACINO | R |
| 9902 | GHOSTBUSTERS | IVAN REITMAN, SIGOURNEY WEAVER | PG |
| 9903 | ALIEN | RIDLEY SCOTT, SIGOURNEY WEAVER | R |

450 APPROVAL HISTORY TABLE

| ACCOUNT ID | ITEM ID | TIMESTAMP | APPROVED |
|---|---|---|---|
| 102 | 9901 | 9/1/2018 17:53:10 | TRUE |
| 103 | 9903 | 9/1/2018 8:12:34 | FALSE |
| 102 | 9902 | 9/2/2018 17:40:56 | TRUE |

FIG. 4

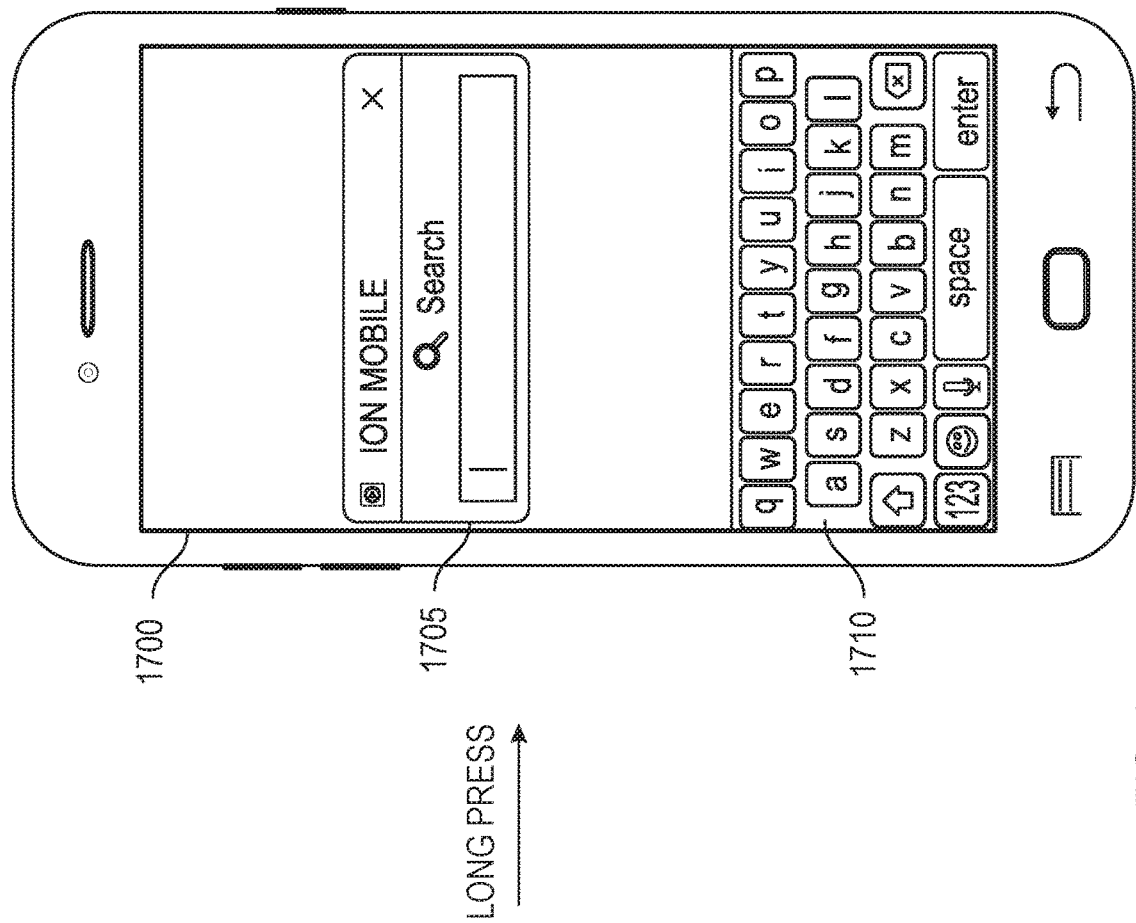
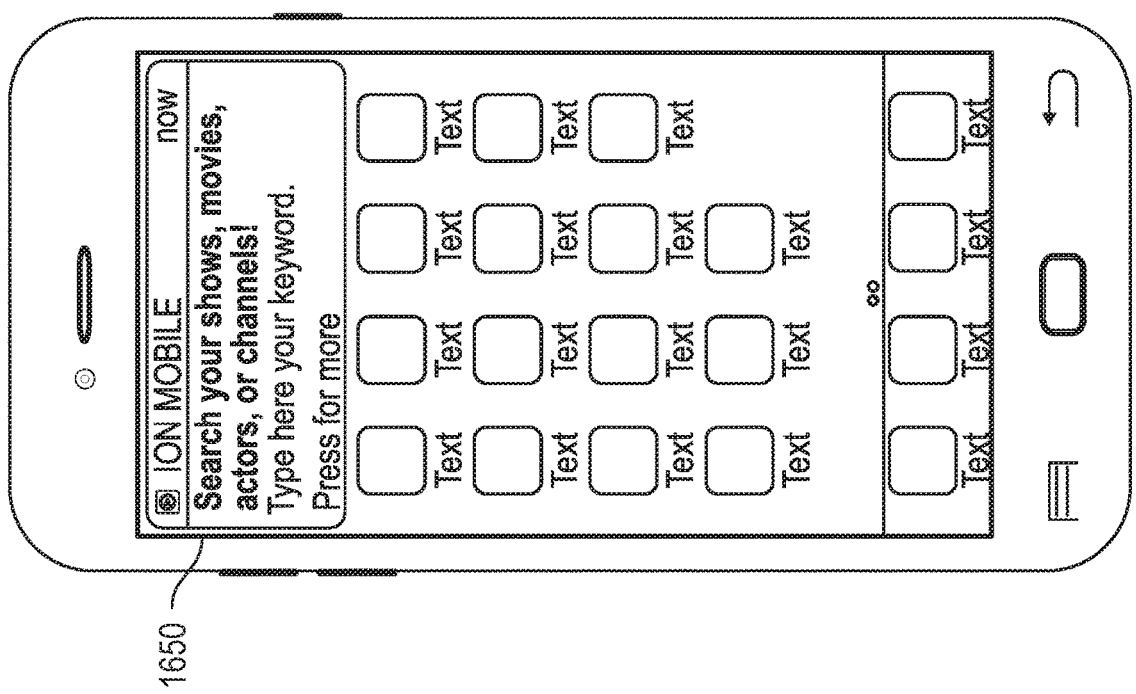
FIG. 17

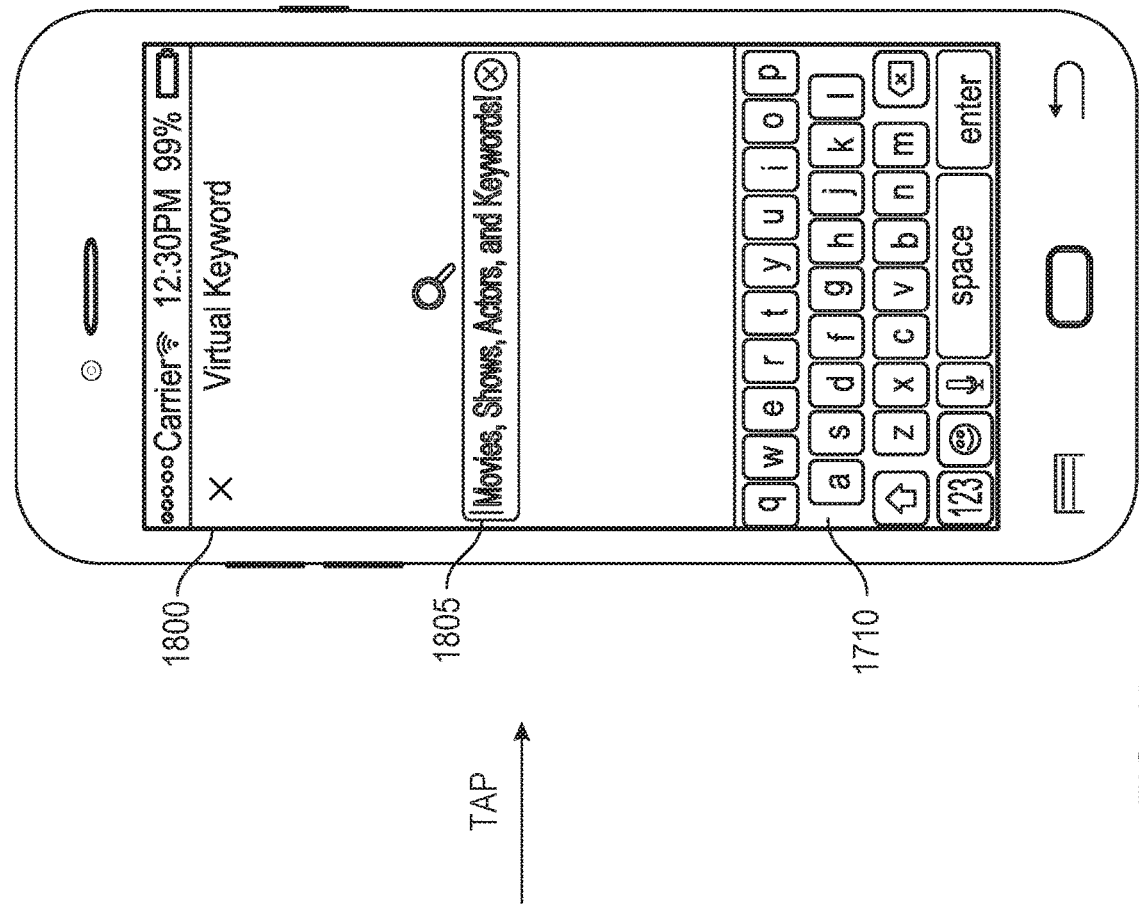
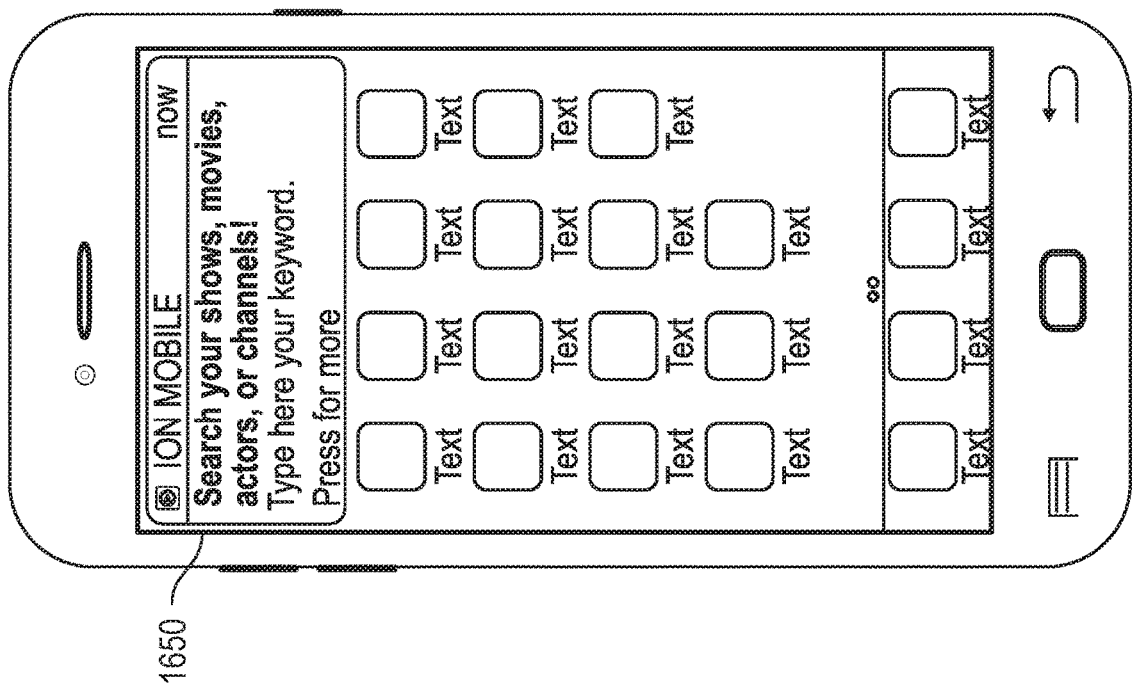
FIG. 18

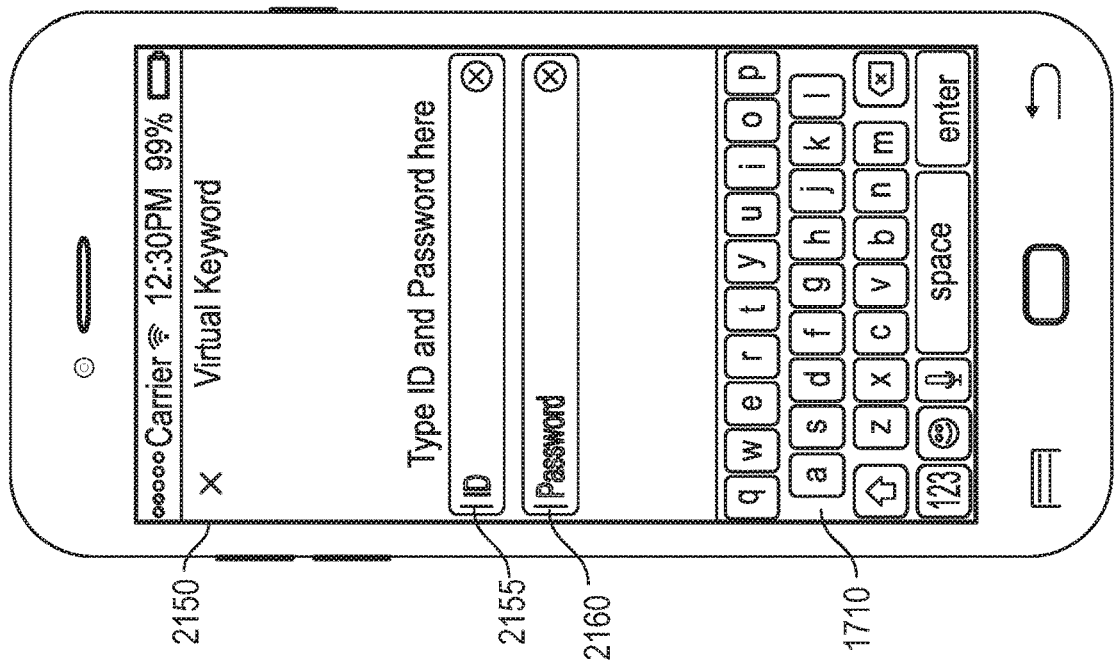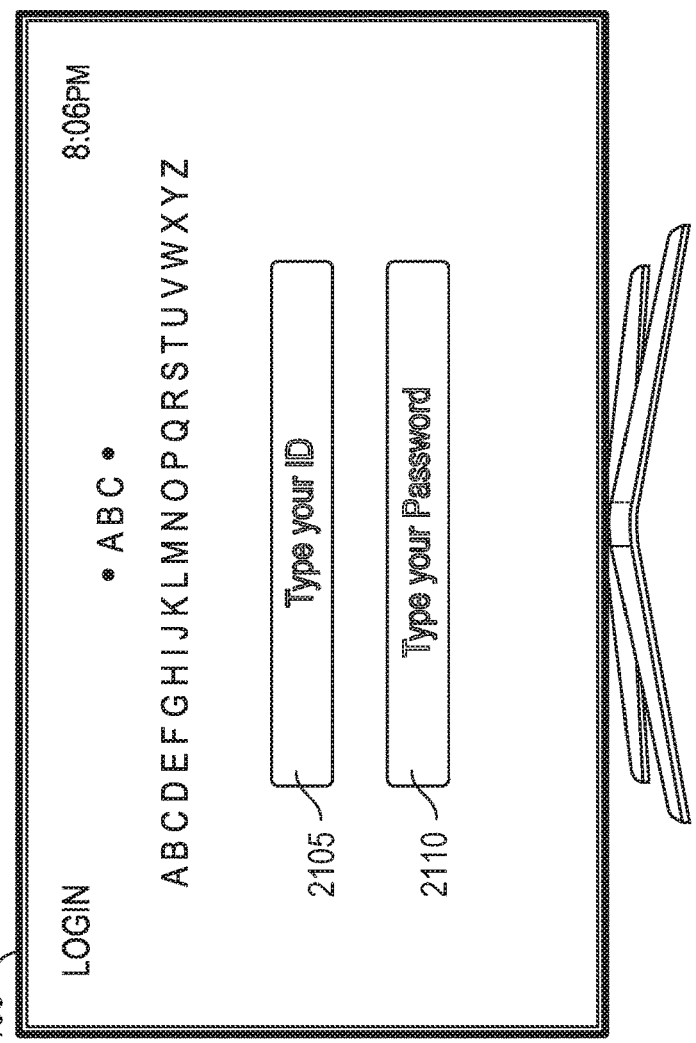
FIG. 21

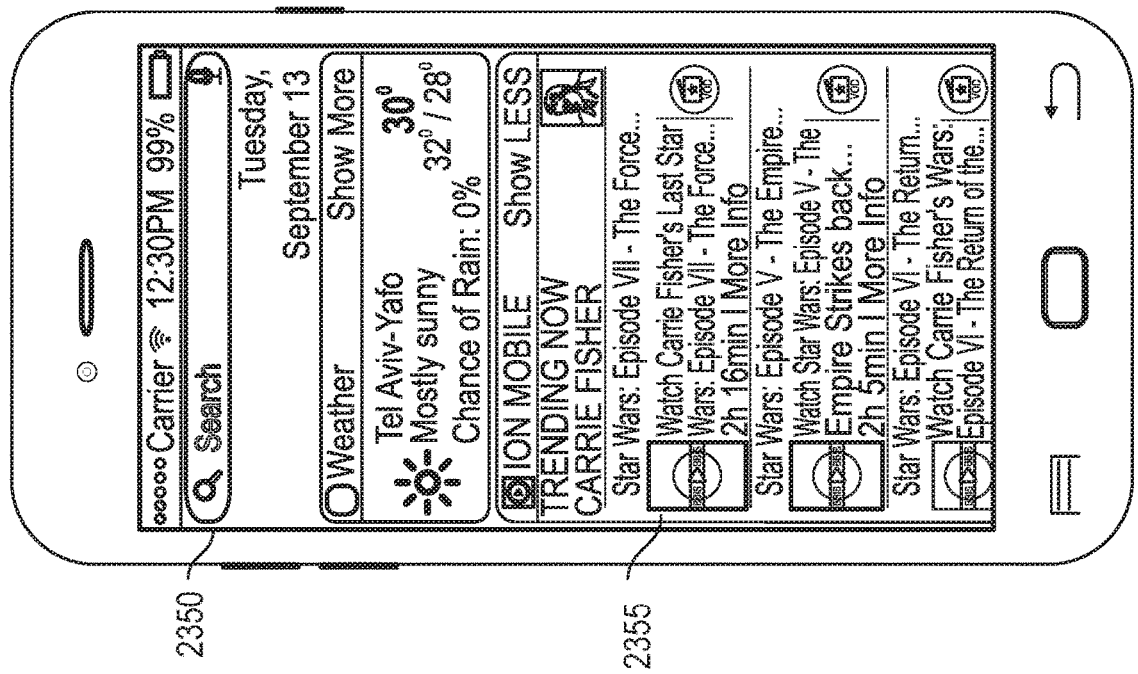
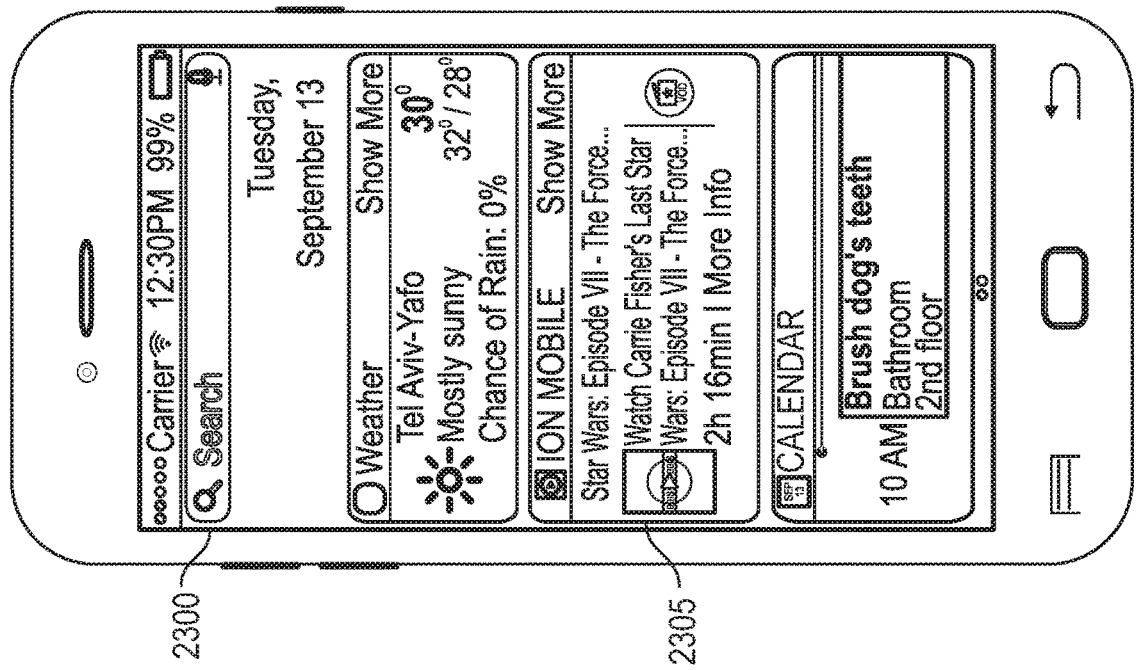
FIG. 23

PARENTAL CONTROLS

PRIORITY CLAIM

This application claims priority to U.S. Provisional Patent Application No. 62/556,416 filed on Sep. 9, 2017, and U.S. Provisional Patent Application No. 62/580,939 filed on Nov. 2, 2017, each of which applications is incorporated in its entirety herein by reference.

FIELD

The embodiments discussed herein are related to control of a first device by a second device. In some embodiments, the first device provides parental controls for a parent user, allowing control of content consumed by a child user of the second device.

BACKGROUND

A parent account may control permissions for a child account. The permissions may allow the child account to view video content items that meet certain predefined criteria, such as rating.

BRIEF DESCRIPTION OF THE DRAWINGS

Example embodiments will be described and explained with additional specificity and detail through the use of the accompanying drawings.

FIGS. 3A and 3B are flowcharts illustrating operations of methods suitable for implementing parental controls, according to some example embodiments.

FIG. 4 is a block diagram illustrating a database schema suitable for implementing parental controls, according to some example embodiments.

FIG. 17 illustrates the example client GUI of FIG. 16 and an example client search GUI.

FIG. 18 illustrates the example client GUI of FIG. 16 and another example client search GUI.

FIG. 21 illustrates an example set-top box GUI for username and password entry and a corresponding client GUI for username and password entry.

FIG. 23 illustrates example client GUIs with a widget that can receive input for a set-top box and where the widget is in an expanded mode.

DETAILED DESCRIPTION OF THE DRAWINGS

Figure 1:
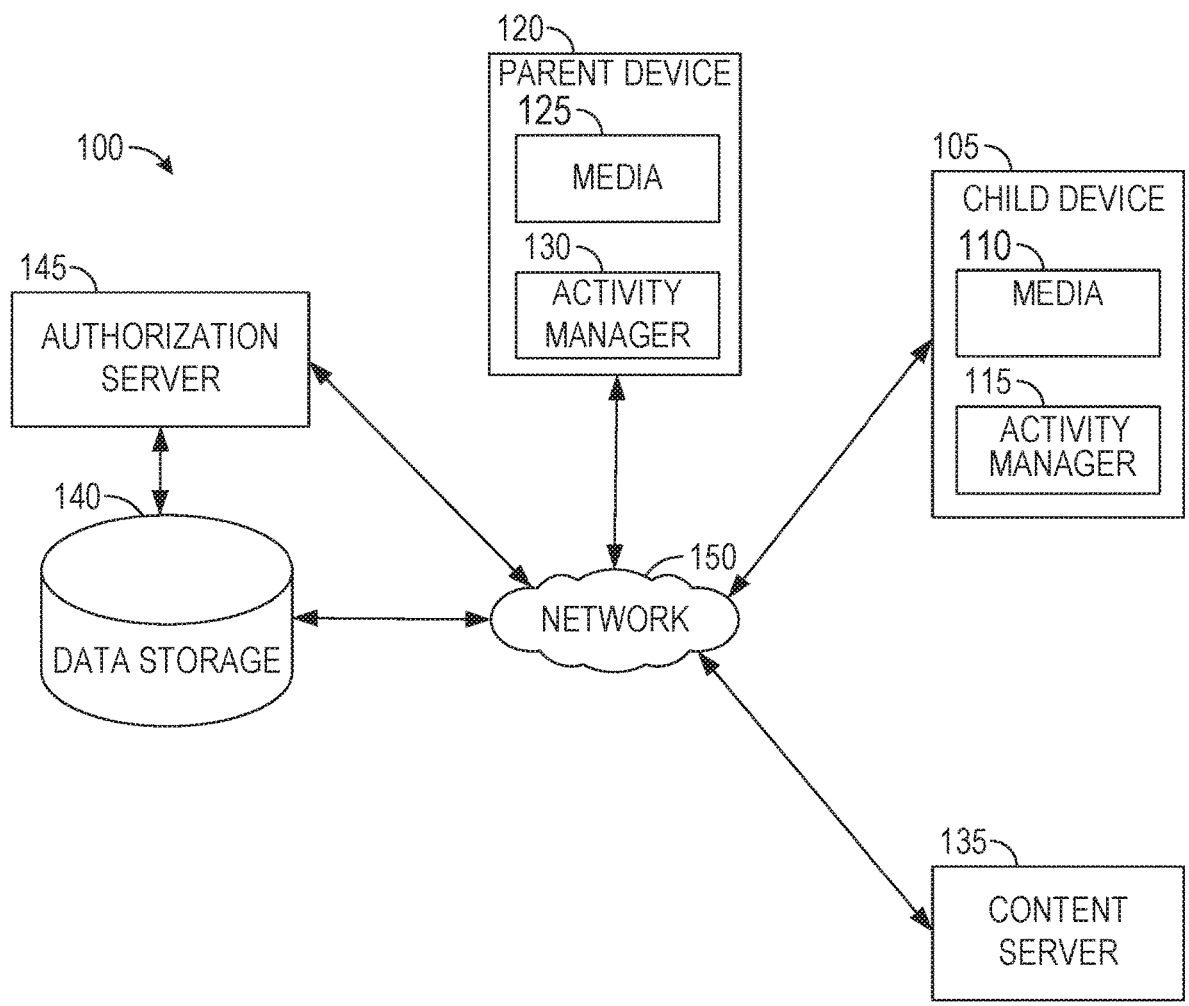
FIG. 1 is a network diagram illustrating a network environment suitable for implementing parental controls, according to some example embodiments.

Client devices may be used to control other devices. Using conventional systems, users may be able to use a client device to initiate control of a secondary device, such as a set-top box, thermostat, refrigerator, audio/video system, etc. Under conventional approaches, however, the device to be controlled (i.e., the secondary device) typically does not initiate the control process. Instead, client devices initiate the control by sending commands to the secondary device.

Aspects of the disclosure address these and other shortcomings of conventional systems by providing systems and methods to control the secondary device using a control device. The secondary device may initiate the control process. In some example embodiments, the control device is associated with a first user account (e.g., a parent user account) and the secondary device is a device associated with a second user account (e.g., a child user account). A user of the secondary device requests authorization to perform an action (e.g., to consume an item of media content), and the control device grants or denies the authorization.

An example system may include a memory and one or more processing devices operatively coupled to the memory. The one or more processing devices may be configured to perform or control performance of operations that may include associating a first device with a second device; identifying a triggering event related to an operation of the second device; in response to identifying the triggering event, sending a message to the first device with a request for information related to the operation of the second device, the first device having a user interface configured to receive the information; receiving, via a network, the information from the first device; and performing the operation at the second device using the information from the first device.

For purposes of illustration and ease in explanation, the present disclosure is described in terms of a mobile device controlling a set-top box. Mobile devices include tablets, smart phones, smart watches, and other wearable devices. Other types of computing devices are also contemplated as being used for either the control device or the secondary device. For example, any of a desktop computer, a laptop computer, or a smart television could be used as either the control device or the secondary device.

A set-top box may process a signal for display on a television. Typically, a set-top box is controlled using a handheld remote. Using the remote and an on-screen interface, a user may browse TV listings, search for content, and otherwise consume media items. The listings and content presented may be selected by the set-top box or a remote server based on a user account. The user account: may be associated with settings that limit the media items that may be consumed. For example, the settings may limit the user account to consuming movie content rated G or PG. As another example, the settings may limit the user account to consuming TV content rated TV-Y, TV-Y7, or TV-G. To view content barred by the settings of the account, a personal identification number (PIN) may be requested. However, if the person who knows the PIN (e.g., a parent) is not physically present, the options are either for the parent to share the PIN, effectively unlocking all media items, not just a particular media item, or for the user to forgo viewing the content. Using systems and methods described herein, authorization to view an individual item of content may be given without requiting the authorizer to be physically present near or at the device being authorized to play the media content.

In some example embodiments, the user of the set-top box requests authorization to view an item of media content. In response, the set-top box causes an interactive notification to be presented on a mobile device. A user of the mobile device provides a response that indicates whether or not the set-top box should play the item of media content. The mobile device transmits the response to the set-top box, which plays the item of media content only if authorized.

The present disclosure also describes the interactive notification including a recommendation to approve or deny the authorization request. In various example embodiments, the recommendation is based on prior responses associated with an account of the user of the mobile device, prior responses associated with an account of the user of the set-top box, prior responses associated with accounts of other users that have one or more attributes in common with the account of the user of the set-top box, prior responses associated with the item of media content, prior responses associated with items of media content that have one or more attributes in common with the item of media content, or any suitable combination thereof. Examples of attributes of user accounts include age and location. Examples of attributes of media content items include content rating, director name, actor name, genre, and release date. As used herein, the term "rating" refers to a content rating related to the content of an item (e.g., R, PG, G, TV-Y, and the like) as opposed to a quality or popularity rating related to the quality of an item (e.g., five stars, 91% fresh, and the like) unless specifically indicated otherwise.

By use of the systems and methods described herein, control of play of media content items on a second device may be controlled by a first device. This provides increased security relative to prior-art systems in which approval to play a media content item is provided using the second device. As a result, the technological system of controlling the second device is improved, as the resulting system is more useful to the user than were prior-art systems. Additionally, by providing a recommended response to the authorization request, the systems and methods described herein may reduce the amount of time taken by a user in responding to the authorization request, reduce the use of other applications by the user in gathering information to respond to the authorization request, or both. As a result, the technological system of controlling the second device using the first device is improved, as the resulting system is more useful to the user than were prior-art systems. Furthermore, allowing the user to respond more quickly reduces the device resources consumed by an application implementing the methods described herein, thus reducing the consumption of processor cycles, network bandwidth, battery life, or any combination thereof.

FIG. 1 is a network diagram illustrating a network environment 100 suitable for implementing parental controls, according to some example embodiments. The network environment 100 includes a child device 105 including media 110 and an activity manager 115, a parent device 120 that includes media 125 and an activity manager 130, a content server 135, data storage 140, an authorization server 145, and a network 150. The content server 135 provides media content items to the child device 105, the parent device 120, or both. The child device 105 plays the media 110 only if authorized by the activity manager 115. The parent device 120 provides or withholds authorization using the activity manager 130. The parent device 120 may provide a preview of the media 110 by playing the media 125. Communication between the activity manager 115 and the activity manager 130 via the network 150 may be implemented using a peer-to-peer architecture or a server-client architecture in which the communication is intermediated by the authorization server 145. The authorization server 145 may generate a response recommendation that is presented on the parent device 120 by the activity manager 130. The response recommendation may be generated based on data accessed from the data storage 140. The child device 105, parent device 120, content server 135, data storage 140, and authorization server 145 may each be implemented in a computer system, in whole or in part, as described below with respect to FIG. 28.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 28. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The child device 105, the parent device 120, the content server 135, the data storage 140, and the authorization server 145 may be connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

In some example embodiments, the child device 105 is a set-top box that provides audio-visual signals to a television and interacts with user via a remote control. For example, the set-top box may cause a user interface (e.g., a menu) to be displayed on the television and the user can interact with the menu by pressing directional inputs and other inputs on the remote control (e.g., select, back, alphanumeric characters, or any suitable combination thereof). Additionally or alternatively, the set-top box may be controlled by a smart device (e.g., a smartphone, a tablet, or a wearable device) comprising a display. In these embodiments, the available inputs may be presented to the user of the smart device in a second user interface.

Figure 2:
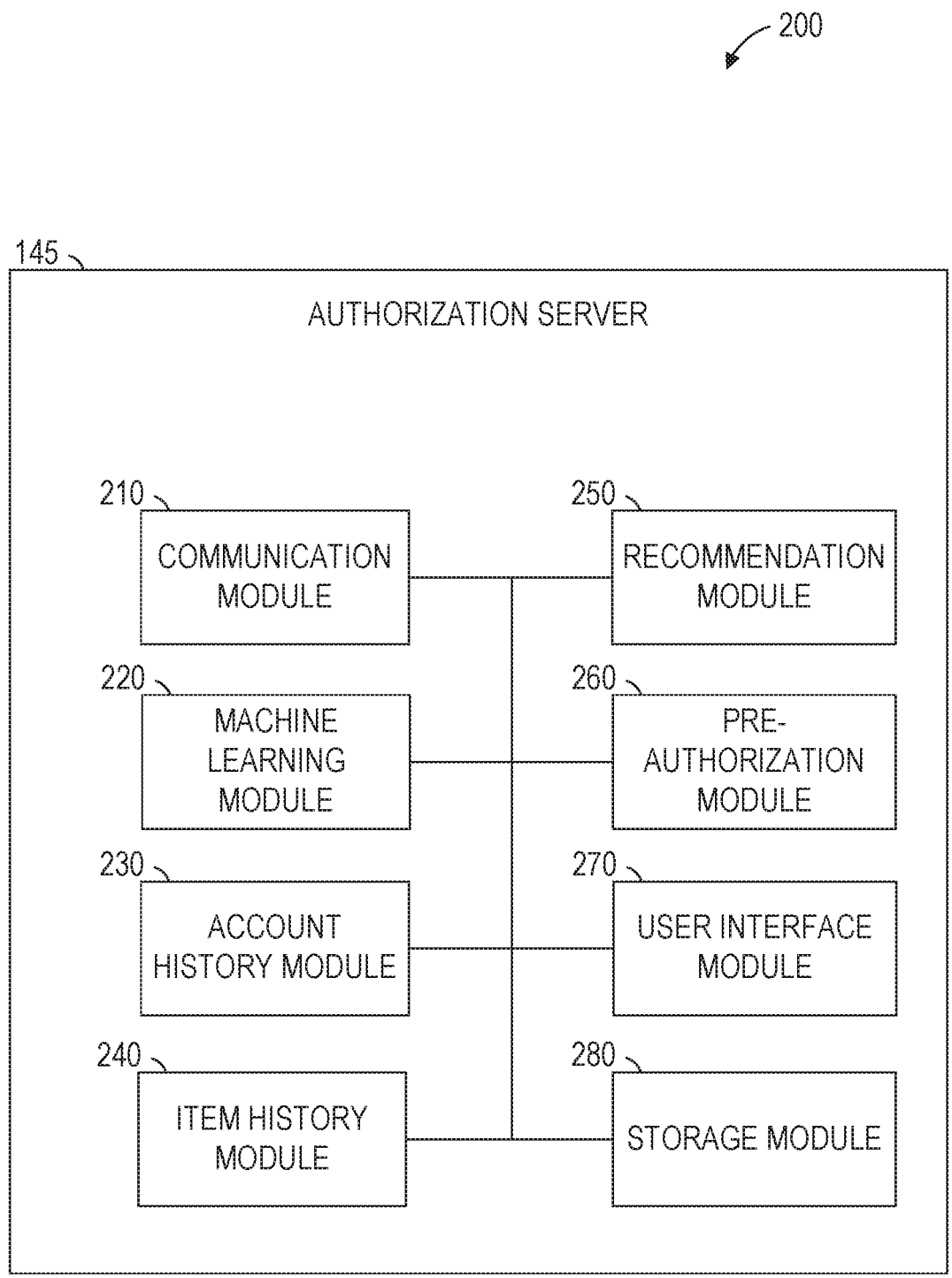
FIG. 2 is a block diagram of an authorization server, according to some example embodiments, suitable for implementing parental controls.

FIG. 2 is a block diagram 200 illustrating components of the authorization server 145, according to some example embodiments. The authorization server 145 is shown as including a communication module 210, a machine learning module 220, an account history module 230, an item history module 240, a recommendation module 250, a pre-authorization module 260, a user interface module 270, and a storage module 280, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the authorization server 145 and transmits data from the authorization server 145. For example, the communication module 210 may receive, from the child device 105, a request for authorization to play a media content item. The communication module 210 provides the request to the pre-authorization nodule 260. The pre-authorization module 260 determines if play of the media content item is pre-authorized (e.g., by accessing settings data using the storage module 280). If play of the media content item is pre-authorized, the communication module 210 transmits the authorization to the child device 105. Alternatively, if play of the media content item is not pre-authorized, the communication module 210 transmits an authorization request to the parent device 120. Communications sent and received by the communication module 210 may be intermediated by the network 150.

The machine learning module 220 implements a machine learning algorithm to generate output for the recommendation module 250. The machine learning module 220 may comprise a convolutional neural network (CNN), recurrent neural network (RNN), long short-term memory (LSTM), or any suitable combination thereof. A machine learning algorithm of the machine learning module 220 may use historical data (e.g., data provided by the account history module 230, the item history module 240, or both) for training. After raining, data for a request for authorization may be provided as an input to the machine learning algorithm. As an output, the machine learning algorithm may provide a probability of the authorization being granted.

The account history module 230 and the item history module 240 store and access data in a database regarding prior responses to authorization requests for each user and prior responses to authorization requests for each media content item, respectively. For example, an approval history table 450, discussed below with respect to FIG. 4, may store data for all approval requests. The account history module 230 may request data from a database server for all entries in the approval history table 450 for a particular user. Similarly, the item history module 240 may request data from the database server for all entries in the approval history table 450 for a particular item.

The recommendation module 250 provides, to the parent device 120, a recommended response to the authorization request. The recommended response may be based on data accessed from the account history module 230, the item history module 240, or both. For example, based on a user account associated with the child device 105, the account history module 230 may retrieve data from the storage module 280, the data regarding prior media content authorized for consumption by the user account, prior media content requested to be authorized by the user account, prior media content denied authorization for consumption by the user account, or any suitable combination thereof.

The recommendation module 250 may compare one or more attributes of the media content item for which authorization is being requested and attributes of the prior media content retrieved by the account history module 230 to identify a set of related media content items. For example, the set of related media content items may be identified based on a keyword of each media content item in the set being the same as a keyword of the media content item for which authorization is being requested. In some example embodiments, a number of keywords in common is compared to a predetermined threshold to determine if the media content items are related. For example, the predetermined threshold may be one, two, or three. The keywords may be organized by category or treated as generic keywords. For example, if the actors and director of a media content item are treated as generic keywords, a film directed by Ron Howard would be found to have a keyword in common with a TV program starring Ron Howard. Alternatively, if the keywords are organized by category such that actors and directors are in different categories, Ron Howard-directed media would have the Ron Howard keyword in common only with other Ron Howard-directed media.

The set of related media content items may be used by the recommendation module 250 to generate a recommendation for a response to the authorization request. For example, the recommendation module 250 may recommend a response that follows a majority of the responses given to requests for authorization for the related media content items. Thus, in this example, if a majority of the related media content items were approved for viewing, the recommendation module 250 would generate a recommendation to approve authorization. The recommendation may also be based on a degree of similarity between the media content item for which authorization is requested and each of the related media content items. For example, the prior response to a request for authorization may be given a weight based on the number of keywords in common. To illustrate, a prior authorization to watch a media content item directed by Ron Howard and starring Tom Hanks may be given twice the weight of a prior denial of authorization to watch a media content item starring Tom Hanks but having a different director, when the media content item for which authorization is being requested is directed by Ron Howard and stars Tom Hanks.

The recommendation module 250 may compare one or more attributes of the account for which authorization is being requested and other accounts that have requested authorization for the media content item to identify a set of related accounts. For example, the set of related accounts may be identified based on the age associated with each account in the set being the same as, or within a predetermined range of, the age associated with the account for which authorization is being requested. As another example, the set of related accounts may be identified based on the location associated with each account in the set being the same as, or within a predetermined distance from, the location associated with the account for which authorization is being requested. In some example embodiments, a number of attributes in common is compared to a predetermined threshold to determine if the accounts are related. For example, the predetermined threshold may be one, two, or three.

The set of related accounts may be used by the recommendation module 250 to generate a recommendation for a response to the authorization request. For example, the recommendation module 250 may recommend a response that follows a majority of the responses given to requests for authorization for the media content item by the related accounts. Thus, in this example, if a majority of the related accounts received authorization to view the media content item, the recommendation module 250 would generate a recommendation to approve authorization. The recommendation may also be based on a degree of similarity between the account for which authorization is requested and each of the related accounts. For example, the prior response to a request for authorization may be given a weight based on the number of attributes in common. To illustrate, a prior authorization to an account with an age value of 7 and a location value of Texas may be given twice the weight of a prior denial of authorization to an account with an age value of 7 and a different location, when the account for which authorization is being requested has an age value of 7 and a location of Texas.

The recommendation module 250 may compare a probability of authorization generated by a machine learning algorithm of the machine learning module 220 to a predetermined threshold (e.g., 50%, 70%, or 80%) to determine, or as a factor in determining, a recommendation.

In some example embodiments, the recommendation module 250 generates a recommendation based on a combination of factors (e.g., an account factor, a media content item factor, and a machine learning factor). The factors may be combined by priority or using weights. For example, a recommendation based on related media content items for the requesting account may take priority over a recommendation based on responses for other accounts. In this example, the recommendation is based on responses for other accounts only when insufficient related media content items are found. For example, the number of identified related media content items may be compared to a threshold (e.g., three related media content items) at or above which the recommendation is based on the related media content items and below which the recommendation is based on related accounts. Using weights, the weighted recommendation value for each prior response for the media content item to a related account is combined with the weighted recommendation value for each prior response to an authorization request for a related media content item for the account to generate a recommendation score. The prior responses may be further weighted by type. For example, the prior authorizations or rejections for the account may be weighted to be equal, in the aggregate, to the prior authorizations or rejections for the media content item.

The probability of authorization generated by the machine learning module 220 may also be weighted and combined with the other factors to generate the authorization recommendation. For example, a 70% chance of authorization reported by the machine learning module 220 may be combined with a historical 40% chance of authorization of the media content item for related accounts and a historical 30% chance of authorization of related media content items for the requesting account to generate (using equal weights for the three types of probabilities) an aggregate 46.67% chance of authorization. Comparing the aggregate result with a predetermined threshold (e.g., 50%), the recommendation module 250 may generate a recommendation to deny the authorization request.

In some example embodiments, the recommendation module 250 retrieves data from a third-party data provider to generate the recommendation. The third-party data provider may be selected using a user interface presented on the parent device 120 (e.g., the UI 2900, described below with respect to FIG. 29). For example, the third-party data provider may be a content-rating organization such as Common Sense Media. As another example, the third-party data provider may be a crowdsourcing platform that aggregates responses from users. Data from the third-party data provider may be interpreted as a probability of authorization. For example, if 70% of respondents on a crowd sourcing platform recommend allowing children to watch a particular item of media content, this may be taken as a 70% chance of authorization. Interpreted in this way, the third-party data may be combined with one or more other recommendation sources as described above to generate the final recommendation.

The user interface module 270 causes a user interface to be presented on the child device 105, the parent device 120, or both. For example, any of the user interfaces of FIGS. 5-12 and 14A-25B may be presented. The user interface module 270 also receives user input via the presented user interface. For example, the user interface module 270 may cause a user interface to be presented on the parent device 120 that requests authorization for the child device 105 to play a media content item. In response to operation of an element of the presented user interface, the user interface module 270 instructs the communication module 210 to send an authorization to the child device 105 to play the media content item.

FIG. 3A a flowchart illustrating operations of a method 300 suitable for implementing parental controls, according to some example embodiments. The method 300 includes operations 305, 310, 315, 320, and 325. By way of example and not limitation, the method 300 is described as being performed by the devices and modules of FIGS. 1-2.

In operation 305 of the method 300, the content server 135 receives a request, via a network and from a first device (e.g., the child device 105), to provide an item of media content. The request may indicate a first account (e.g., an account of a user of the child device 105). Before providing a response to the request, the content server 135 requests authorization from the authorization server 145. In some example embodiments, the content server 135 and the authorization server 145 are implemented as a single server.

In operation 310, the recommendation module 250 of the authorization server 145 accesses a recommended response to the request. The recommended response may be a recommendation to authorize access to the item of media content or a recommendation to deny access to the item of media content. The accessed recommended response may be generated by the recommendation module 250 based on the item of media content, the first account, prior responses associated with the first account, prior responses associated with a second account of the user of the second device, prior responses associated with accounts of other users that have one or more attributes in common with the first account, prior responses associated with the item of media content, prior responses associated with items of media content that have one or more attributes in common with the item of media content, or any suitable combination thereof.

In operation 315, the user interface module 270 causes a user interface to be presented on a second user device (e.g., the parent device 120). The second user device may be associated with a second user account (e.g., an account of the user of the parent device 120). The user interface includes the recommended response. For example, a user interface 500 of FIG. 5, described below, may be presented. In some example embodiments, the user interface is caused to be presented by sending a web page (e.g., a Hypertext Markup Language (HTML) file) for parsing by a web browser of the second user device. In other example embodiments, the user interface is caused to be presented by sending data using an application programming interface (API) provided by the activity manager 130.

The user interface module 270 receives, via the user interface, an approval to provide the media content item (operation 320). For example, a user may tap a button presented on a touch screen to indicate approval to provide the media content item. In response to detecting the button press, the activity manager 130 notifies the user interface module 270 via the network 150.

In operation 325, based on the approval, the content server 135 causes the media content item to be provided to the first device. For example, the authorization server 145 may respond to an authorization request from the content server 135, via the network 150, with an authorization to provide the media content item to the child device 105. As a result, the child device 105 receives the media 110. In some example embodiments, the child device 105 plays the media 110 as the media is received or in response to the media being received (e.g., using the user interface 1000 of FIG. 10, below).

In some example embodiments, the authorization received in operation 320 is maintained indefinitely or for a predetermined period of time. In these example embodiments, a second request to replay the same media content item for the first account is automatically approved based on the already-received authorization. Thus, for the replay request, only operations 305 and 325 are performed. In embodiments in which the authorization remains valid for a predetermined period of time, a second request occurring after the predetermined period of time has elapsed will result in the method 300 being repeated for the second request.

FIG. 3B a flowchart illustrating operations of a method 350 suitable for implementing parental controls, according to some example embodiments. The method 350 includes operations 355, 360, 365, 370, and 375. By way of example and not limitation, the method 350 is described as being performed by the devices and modules of FIGS. 1-2.

In operation 355 of the method 350, the content server 135 receives a request, via a network and from a first device (e.g., the child device 105), to provide an item of media content. The request may indicate a first account (e.g., an account of a user of the child device 105). Before providing a response to the request, the content server 135 requests authorization from the authorization server 145.

In operation 360, the recommendation module 250 of the authorization server 145 accesses a recommended response to the request. The recommended response may be a recommendation to authorize access to the item of media content or a recommendation to deny access to the item of media content. The accessed recommended response may be generated by the recommendation module 250.

In operation 365, the user interface module 270 causes a user interface to be presented on a second user device (e.g., the parent device 120). The second user device may be associated with a second user account (e.g., an account of the user of the parent device 120). The user interface includes the recommended response. For example, a user interface 500 of FIG. 5, described below, may be presented.

The user interface module 270 receives, via the user interface, a denial of the request to provide the media content item (operation 370). For example, a user may tap a button presented on a touch screen to indicate denial of the request. In response to detecting the button press, the activity manager 130 notifies the user interface module 270 via the network 150.

In operation 375, based on the denial, the content server 135 causes presentation of a user interface for the first account on the first device, the user interface comprising a notification of denial of authorization for the media content item to be accessed on the first device by the first account. For example, the authorization server 145 may respond to an authorization request from the content server 135, via the network 150, with a denial of the request to provide the media content item to the child device 105. As a result, the child device 105 displays a user interface that includes a notification of the denial (e.g., using the user interface 1250 of FIG. 12B, described below).

In some example embodiments, the denial received in operation 370 is maintained indefinitely or for a predetermined period of time. In these example embodiments, a second request to play the same media content item for the first account is automatically denied based on the already-received denial. Thus, for the replay request, only operations 355 and 375 are performed. In embodiments in which the denial remains valid for a predetermined period of time, a second request occurring after the predetermined period of time has elapsed will result in the method 300 or 350 being repeated for the second request.

FIG. 4 is a block diagram illustrating a database schema 400 suitable for implementing parental controls, according to some example embodiments. The database schema 400 includes an account table 405, a viewing history table 420, an item table 435, and an approval history table 450. The account table 405 has rows 415A, 415B, and 415C of a format 410. The viewing history table 420 has rows 430A, 430B, and 430C of a format 425. The item table 435 has rows 445A, 445B, and 445C of a format 440. The approval history table 450 has rows 460A, 460B, and 460C of a format 455. Tables of the database schema 400 may be stored in one database or in multiple databases.

The format 410 of the account table 405 includes an account identifier (ID), a parent ID, a name, and an age. The account ID field stores a unique identifier for the account. The parent ID field stores a unique identifier for an account that may be requested to authorize consumption of media content items, or NULL if no such account exists (e.g., if the account is for an adult). The name field stores a name associated with the account (e.g., a name of a user of the account). The age field stores an age associated with the account (e.g., an age of a user of the account). Thus, the row 415A is for an account with account ID 101, no parent account, a name of Paul, and an age of 38; the row 415B is for an account with account ID 102, parent ID 101 (the Paul account), a name of Leto, and an age of 17; and the row 415C is for an account with account ID 103, parent ID 101, a name of Jessica, and an age of 6. Rows in the account table 405 using an account ID are associated with rows in the viewing history table 420 and the approval history table 450 using the same account ID.

Each row of the viewing history table 420 stores data for a viewing of a media content item. The format 425 of the viewing history table 420 includes an account ID for an account that did the viewing, a timestamp with the date and time at which the viewing began, an item ID for the item viewed, and a duration of the viewing. Rows in the viewing history table 420 using an item ID are associated with rows in the item able 435 using the same item ID and with rows in the approval history table 450 using the same item ID. Thus, the row 430A is for a viewing of item 9901 (Heat, as indicated by the row 445A of the item table 435) by account 102. (Leto, as indicated by the row 415B of the account table 405) beginning at 17:53:27 on Sep. 1, 2018 and lasting for 45 minutes. Similarly, the row 430B is for a viewing by Leto of Ghostbusters, and the row 430C is for a viewing of Heat by Jessica.

The format 440 of the item table 435 includes an item ID, a title, keywords, and a rating. The item ID is a unique identifier of the media content item, used for cross-referencing data in the item table 435 with data in the viewing history table 420 and the approval history table 450. The title is a title of the media content item. The keywords field stores keywords for the media content item. In some example embodiments, the keywords field is divided into multiple fields containing specific types of keywords (e.g., director, actors, genre, topic, year of release, and awards). The rating field stores a rating for the media content item. Thus, the row 445A is for item ID 9901, titled Heat and rated R, with keywords "Michael Mann" and "Al Pacino"; the row 445B is for item ID 9902, titled Ghostbusters and rated PG, with keywords "Ivan Reitman" and "Sigourney Weaver"; and the row 445C is for item ID 9903, titled Alien and rated R, with keywords "Ridley Scott" and "Sigourney Weaver."

Each row of the approval history table 450 stores data for a previous request for authorization to view a media content item. The format 455 of the approval history table 450 includes an account ID of the account that requested authorization, an item ID of the item for which the authorization was requested, a timestamp indicating when the authorization was requested, and a Boolean approved value that indicates whether authorization was granted. Thus, the row 460A is for a request by account ID 102 (Leto) for item ID 9901 (Heat) that was approved. The request was made at 17:53:10 on Sep. 1, 2018. Similarly, the row 460B is for a request by Jessica to watch Alien, which was denied, and the row 460C is for a request by Leto to watch Ghostbusters, which was approved.

Figure 5:
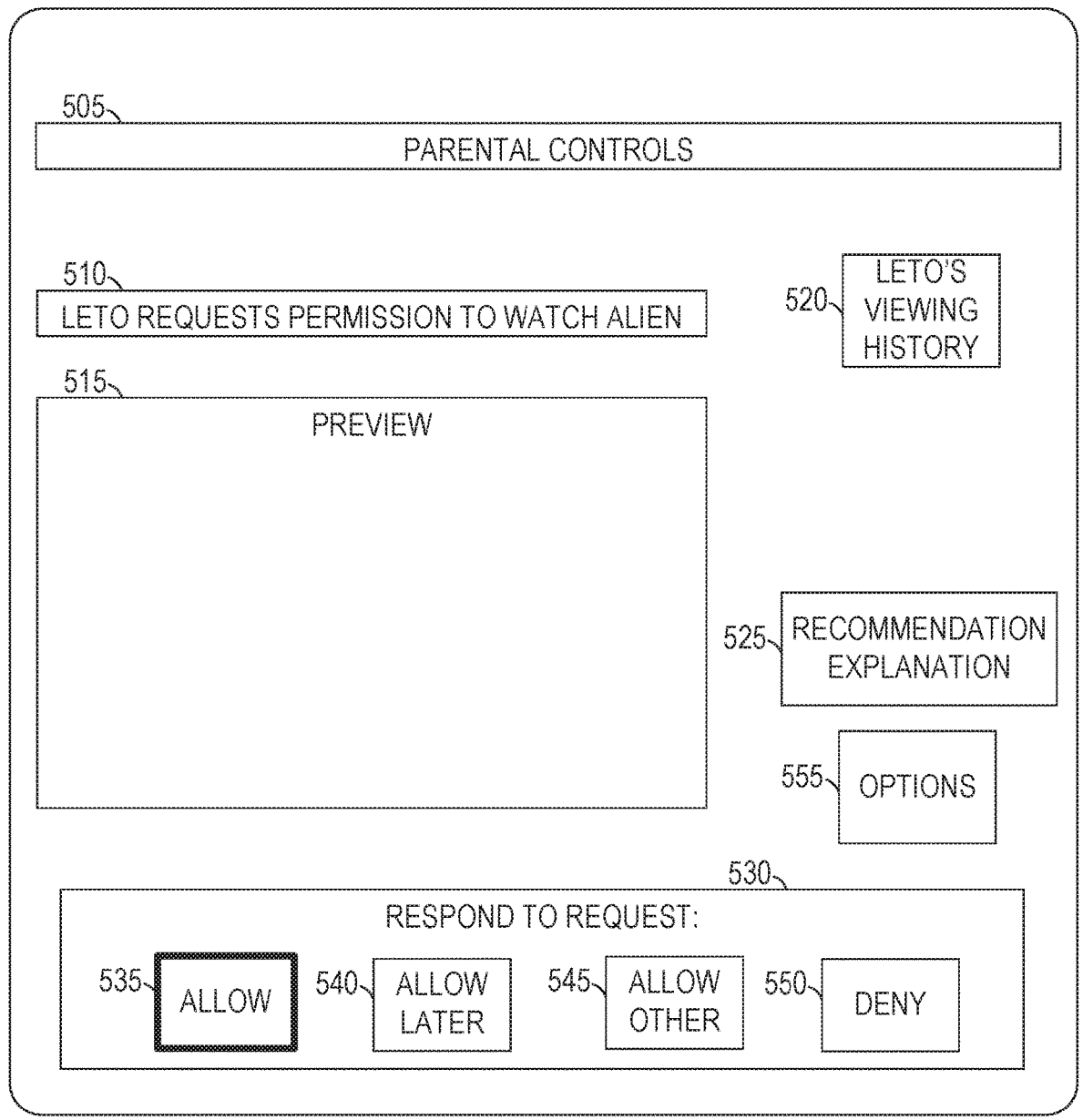
FIG. 5 is a user interface diagram illustrating a user interface suitable for implementing parental controls, according to some example embodiments.

FIG. 5 is a user interface diagram illustrating a user interface 500 suitable for implementing parental controls, according to some example embodiments. As can be seen in the user interface diagram, the user interface 500 includes a title 505, "Parental Controls"; an informational message 510; a preview area 515; a response area 530; and selectable options 520, 525, 535, 540, 545, 550, and 555. The user interface 500 is suitable for presentation on a device of a parent account in operation 315 of the method 300 or operation 365 of the method 350. In some example embodiments, the selectable options 520, 525, 535, 540, 545, 550, and 555 are buttons.

The informational message 510 indicates the account that is requesting authorization and the media content item for which authorization is being requested. In the example of FIG. 5, Leto (account ID 102 in the database schema 400) is requesting authorization to view Alien (item ID 9903 in the database schema 400). The selectable option 520 is operable to cause presentation of viewing history information associated with the requesting account. The preview area 515 presents, or is operable to present, the media content item being requested (i.e., Alien, in this example).

The response area 530 comprises the selectable options 535, 540, 545, and 550. The selectable option 535 corresponds to authorization of access and is operable to authorize the viewing of the media content item. The selectable option 550 corresponds to denial of access and is operable to deny the viewing of the media content item. The selectable option 540 is operable to allow a later viewing of the media content item (e.g., to cause display of a user interface 800 of FIG. 8 that facilitates selection of a particular delay). The selectable option 545 is operable to authorize viewing of a different media content item (e.g., to cause display of a user interface 700 of FIG. 7 that facilitates selection of a particular replacement media content item). A display attribute (e.g., color, size, opacity, or position) for the selectable option 535 is altered based on the option corresponding to the selectable option 535 being the recommended response. As shown in FIG. 5, the selectable option 535 has a thicker border than the selectable options 540, 545, and 550, indicating that allowing Leto to view Alien is the recommended response. The selectable option 525 is operable to cause display of information supporting the recommendation (e.g., to cause display of a user interface 600 of FIG. 6).

The selectable option 555 is operable to cause the display of a UI for configuration options for the parental controls. For example, in response to operation of the selectable option 555, the UI 2900 of FIG. 29 may be displayed.

The user interface 500 is shown as a graphical user interface controlled by a user pressing buttons (e.g., by mouse click or touching a touch screen) graphical user interface may also be controlled by a sequence of presses on a keyboard (e.g., Enter to select a first option, Tab or right arrow followed by Enter to select a second option, Tab or tight arrow twice followed by Enter to select a third option, or any suitable combination thereof) or one or more keys pressed in combination (e.g., 1 to select the first option, 2 to select the second option, Ctrl-A to select an authorize option, Ctrl-D to select a deny option, or any suitable combination thereof). In some example embodiments, the graphical user interface is controlled by voice command (e.g., a speech recognition module may recognize the word "allow," "authorize," or "yes" as selection of the option to authorize media content, the speech recognition module may recognize the word "deny," "reject," or "no" as selection of the option to deny media content, or any suitable combination thereof).

In other example embodiments, the user interface 500 is replaced or supplemented by an interactive voice menu that provides at least a subset of the information and options of the user interface 500. For example, a text-to-speech module may read the text of the user interface 500 aloud. The user may respond with a voice command corresponding to one of the selectable options of the user interface 500. For example, the user may say "viewing history," "explanation," "allow," "allow later," "allow other," "deny," or "options" to operate a corresponding one of the selectable options 520, 525, 535, 540, 545, 550, and 555. As another example, the parent device 120 may be a smart phone and the authorization server 145 may call the parent device 120 and provide the information and options of the user interface 500 verbally, without a graphical user interface. The parent device 120 may transmit voice data from the user to the authorization server 145. The authorization server 145, using a voice recognition module, determines if the voice data indicates a selectable option (e.g., "allow" or "deny") and responds as described above with respect to the corresponding selectable options of the user interface 500.

Figure 6:
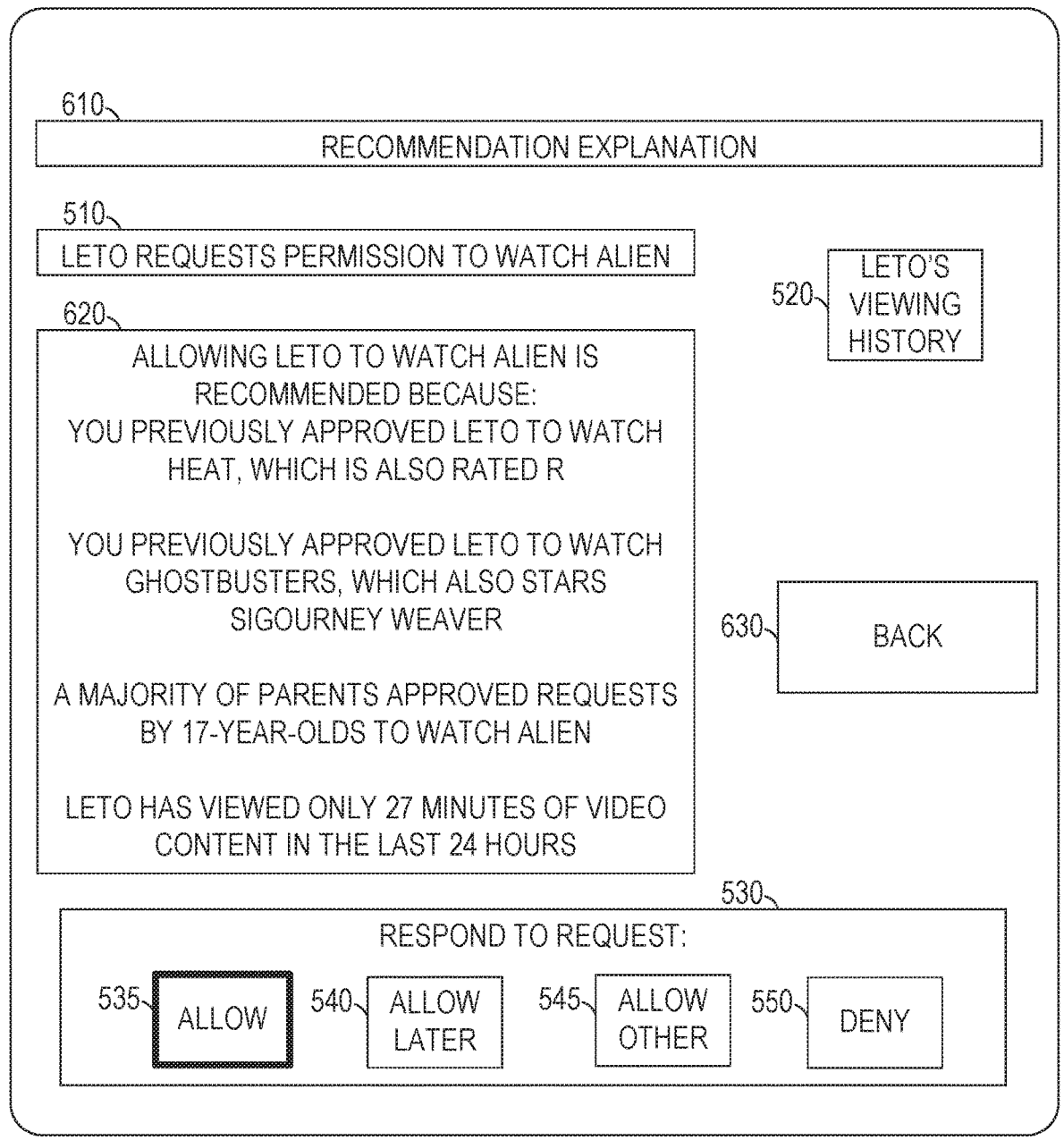
FIG. 6 is a user interface diagram illustrating a user interface suitable for implementing parental controls, according to some example embodiments.

FIG. 6 is a user interface diagram illustrating a user interface 600 suitable for implementing parental controls, according to some example embodiments. As can be seen in the user interface diagram, the user interface 600 includes a title 610, "Recommendation Explanation"; the informational message 510; an explanation area 620; the response area 530; the selectable options 520, 535, 540, 545, and 550; and a button 630. The user interface 600 is suitable for presentation on a device of a parent account after operation of the selectable option 525 (FIG. 5). The informational message 510, the response area 530, and the selectable options 520, 535, 540, 545, and 550 are described above, with respect to FIG. 5. The button 630 is operable to return to the user interface 500 (FIG. 5).

The explanation area 620 includes one or more reasons to support the recommendation to allow viewing of the requested media content item. As shown in FIG. 6, the reasons include previous approvals for Leto to watch Heat and Ghostbusters, each of which is related to Alien, either by having the same rating or having an actor (or keyword) in common; majority approval by other parents for other accounts to view the requested media content item, wherein the other accounts have the same age attribute as the requesting account; and a total amount of media content consumed by the requesting account being below a predetermined threshold (e.g., 2 hours of viewing per 24 hours).

Figure 7:
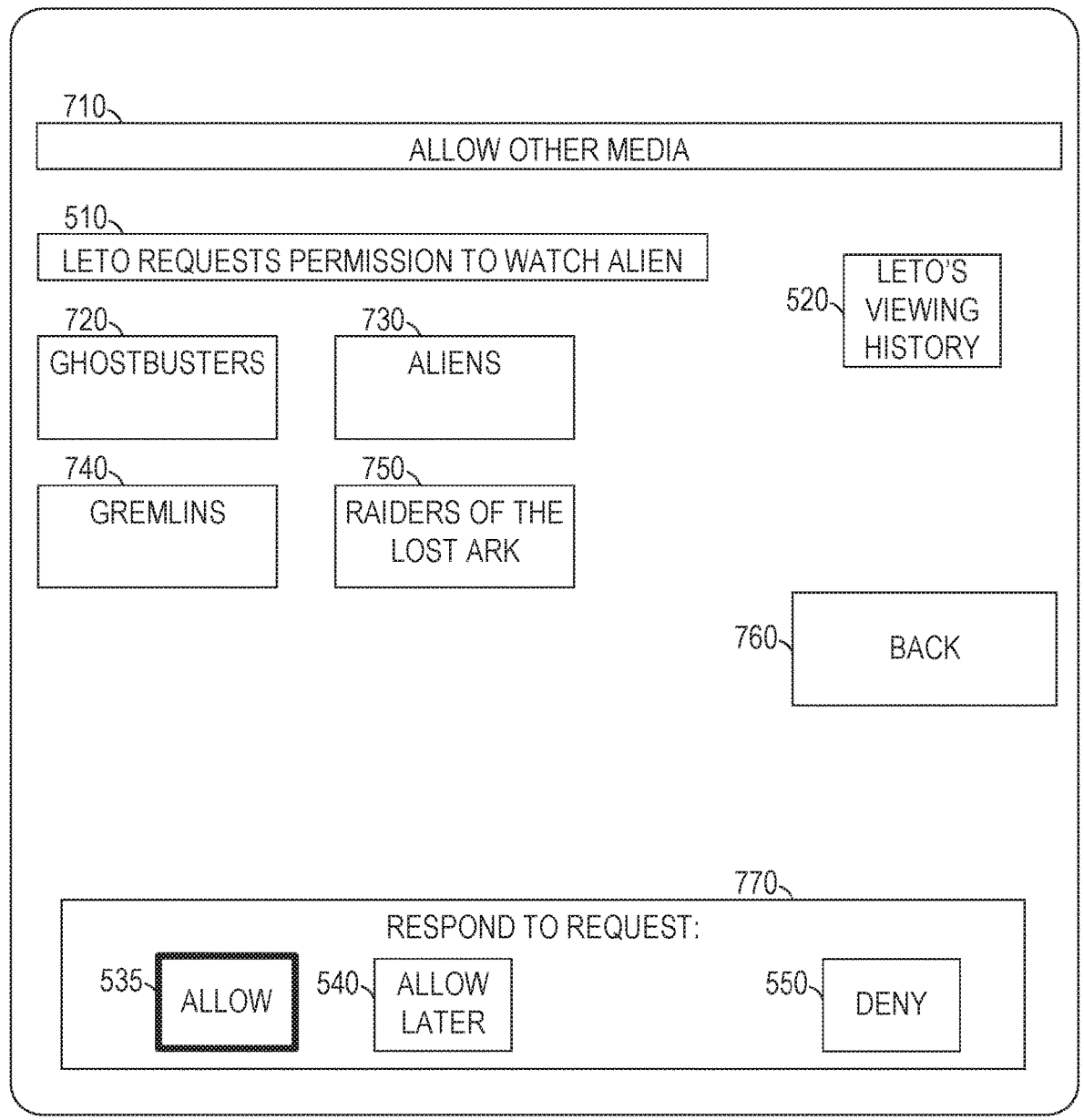
FIG. 7 is a user interface diagram illustrating a user interface suitable for implementing parental controls, according to some example embodiments.

FIG. 7 is a user interface diagram illustrating a user interface 700 suitable for implementing parental controls, according to some example embodiments. As can be seen in the user interface diagram, the user interface 700 includes a title 710, "Allow Other Media"; the informational message 510; a response area 770; the selectable options 520, 535, 540, and 550; and buttons 720, 730, 740, 750, and 760. The user interface 700 is suitable for presentation on a device of a parent account after operation of the selectable option 545 (FIG. 5). The informational message 510 and the selectable options 520, 535, 540, and 550 are described above, with respect to FIG. 5. The button 760 is operable to return to the user interface 500 (FIG. 5). The response area 770 includes the selectable options 535, 540, and 550, but the selectable option 545 (operable to cause display of the user interface 700) has been removed, since the user interface 700 is already being displayed. Each of the buttons 720, 730, 740, and 750 is operable to provide authorization to view a corresponding media content item instead of the requested media content item. For example, operation of the button 750 may cause a user interface 1100 (FIG. 11) to be presented on the device that requested authorization.

In some example embodiments, the media content items associated with the buttons 720-750 are pre-approved media content items. By only presenting pre-approved media content items, the parent is saved the further challenge of determining of the alternative media content items are appropriate at the time of the request. Instead, the parent may have, at a more convenient time, pre-approved one or more media content items to speed later authorization.

Additionally or alternatively, the media content items associated with the buttons 720-750 may be generated by the recommendation module 250. For example, a set of media content items of interest to the child may be identified (e.g., based on a degree of similarity to the requested media content item based on genre, actors, director, year of release, title, language, or any suitable combination thereof) and a probability of authorization determined for each media content item in the set. The probability of authorization may be compared to a predetermined threshold (e.g., 70%) and, if the probability meets or exceeds the threshold, the media content item added as a recommended alternative media content item.

Figure 8:
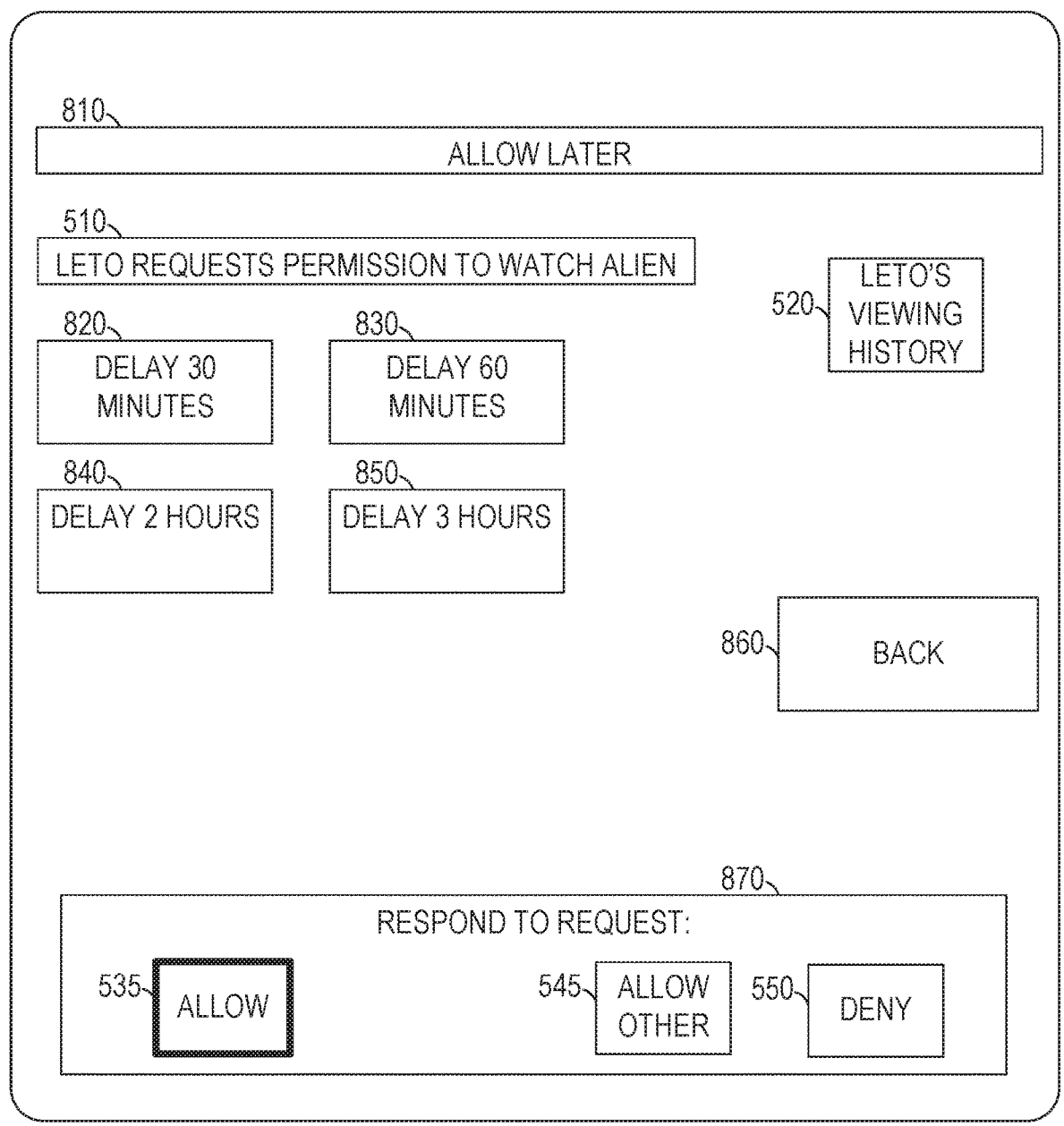
FIG. 8 is a user interface diagram illustrating a user interface suitable for implementing parental controls, according to some example embodiments.

FIG. 8 is a user interface diagram illustrating a user interface 800 suitable for implementing parental controls, according to some example embodiments. As can be seen in the user interface diagram, the user interface 800 includes a title 810, "Allow Later"; the informational message 510; a response area 870; the selectable options 520, 535, 545, and 550; and buttons 820, 830, 840, 850, and 860. The user interface 800 is suitable for presentation on a device of a parent account after operation of the selectable option 540 (FIG. 5). The informational message 510 and the selectable options 520, 535, 545, and 550 are described above, with respect to FIG. 5. The button 860 is operable to return to the user interface 500 (FIG. 5). The response area 870 includes the selectable options 535, 545, and 550, but the selectable option 540 (operable to cause display of the user interface 800) has been removed, since the user interface 800 is already being displayed. Each of the buttons 820, 830, 840, and 850 is operable to provide authorization to view the requested media content item after a delay. For example, operation of the button 830 may cause a user interface 1200 (FIG. 12) to be presented on the device that requested authorization.

Figure 9:
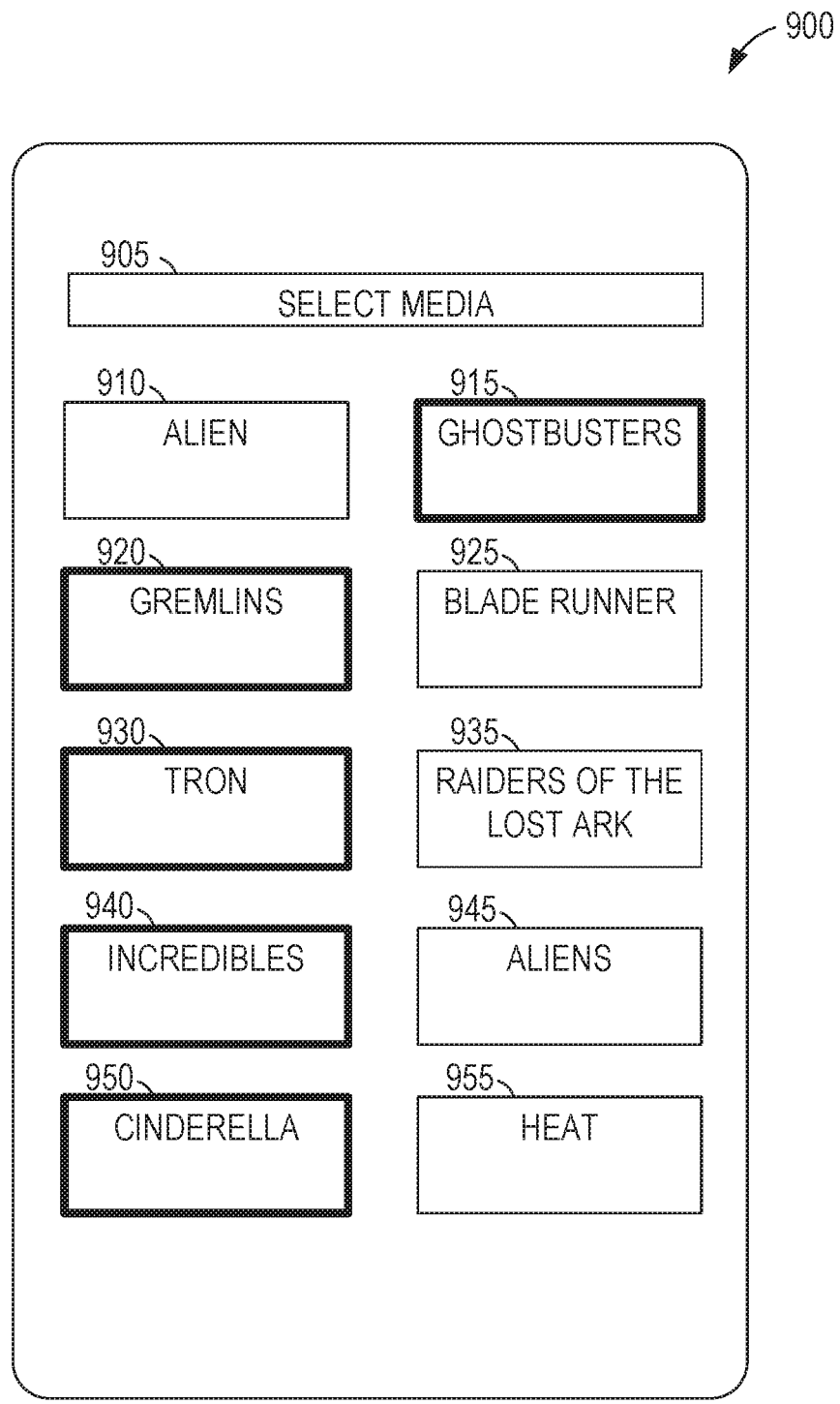
FIG. 9 is a user interface diagram illustrating a user interface suitable for selecting media content, according to some example embodiments.

FIG. 9 is a user interface diagram illustrating a user interface 900 suitable for selecting media content, according to some example embodiments. As can be seen in the user interface diagram, the user interface 900 includes a title 905, "Select Media"; and buttons 910, 915, 920, 925, 930, 935, 940, 945, 950, and 955. The buttons 910, 925, 935, 945, and 955 are each operable to cause a request for authorization to play a corresponding media content item to be sent. The buttons 915, 920, 930, 940, and 950 are each operable to cause a corresponding media content item to play. In some example embodiments, the buttons operable to cause a media content item to play are distinguished from the buttons operable to cause a request for authorization to be sent by one or more graphical attributes. In the example of FIG. 9, the buttons operable to cause a media content item to play are presented with a heavier border than the buttons operable to request authorization. Operation of one of the buttons 910, 925, 935, 945, or 955 may initiate execution of the method 300 or the method 350.

One account may control which media content items may be played immediately by a second account and which require authorization. For example, a parent may permit G- and PG-rated movies to be viewed without express authorization but retain the power of individual approval for PG-13 and R-rated movies. Whether or not authorization is needed may also be based on the current time. For example, a teen may be given permission to watch R-rated movies without specific authorization beginning at 9 pm, after younger children go to bed.

In the embodiments in which the UI 700 of FIG. 7 displays only pre-approved media content items for selection by the parent as replacement media content, the same criteria may be used in the UI 700 and the UI 900. In other words, the UI 700 may include only media content items that would be available for immediate play in the UI 900.

Figure 10:
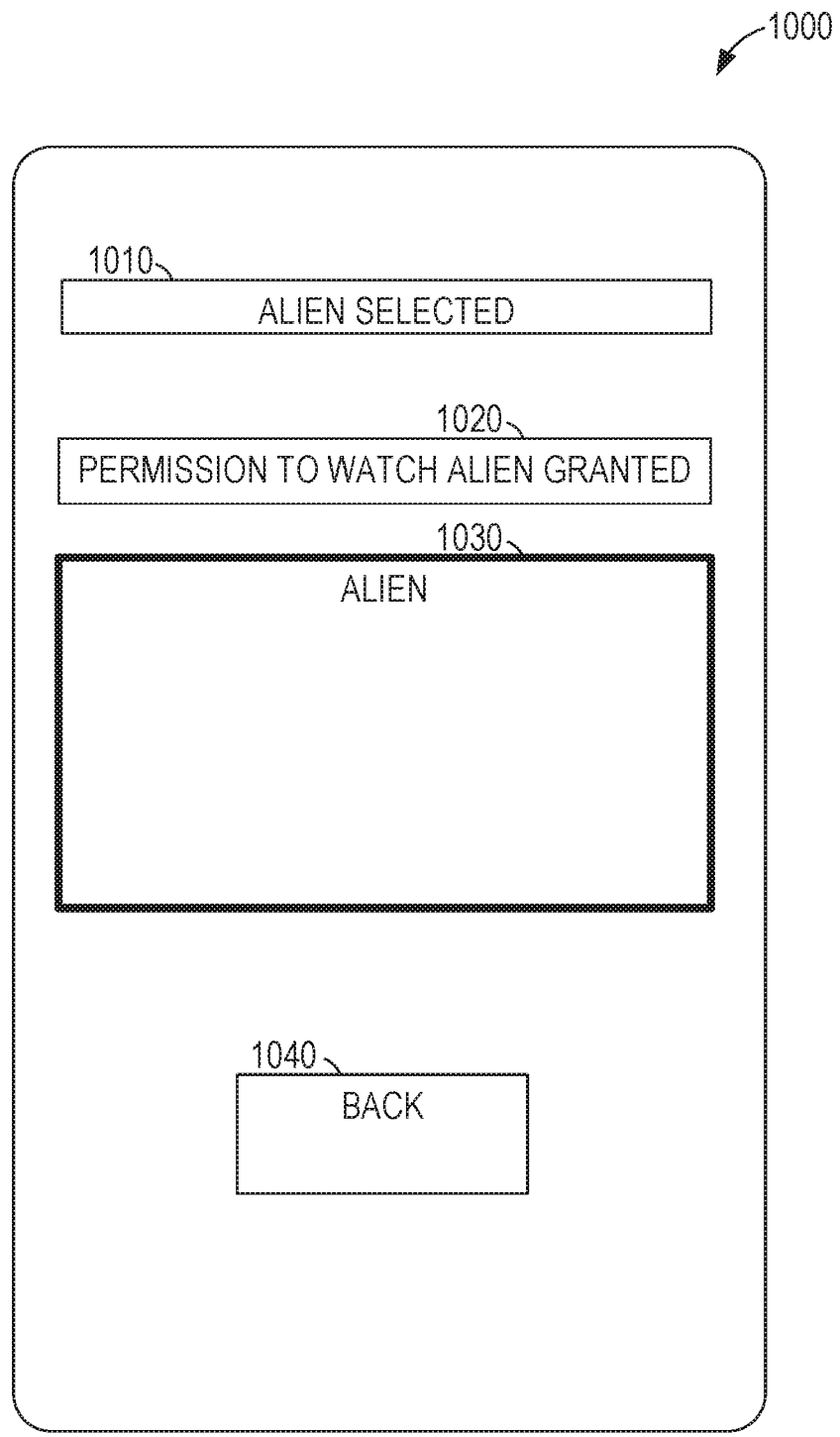
FIG. 10 is a user interface diagram illustrating a user interface suitable for viewing media content, according to some example embodiments.

FIG. 10 is a user interface diagram illustrating a user interface 1000 suitable for viewing media content, according to some example embodiments. The user interface 1000 may be presented on the child device 105 after operation of the selectable option 535 (FIG. 5) on the parent device 120. The user interface 1000 includes a title 1010, "Alien Selected"; an informational message 1020; a viewing area 1030; and a button 1040. The informational message 1020 indicates whether or not authorization to view the requested media content item was granted. Since authorization was granted, the viewing area 1030 displays, or is operable to cause the display of, the selected media content item. The button 1040 is operable to return to the user interface 900 (FIG. 9).

Figure 11:
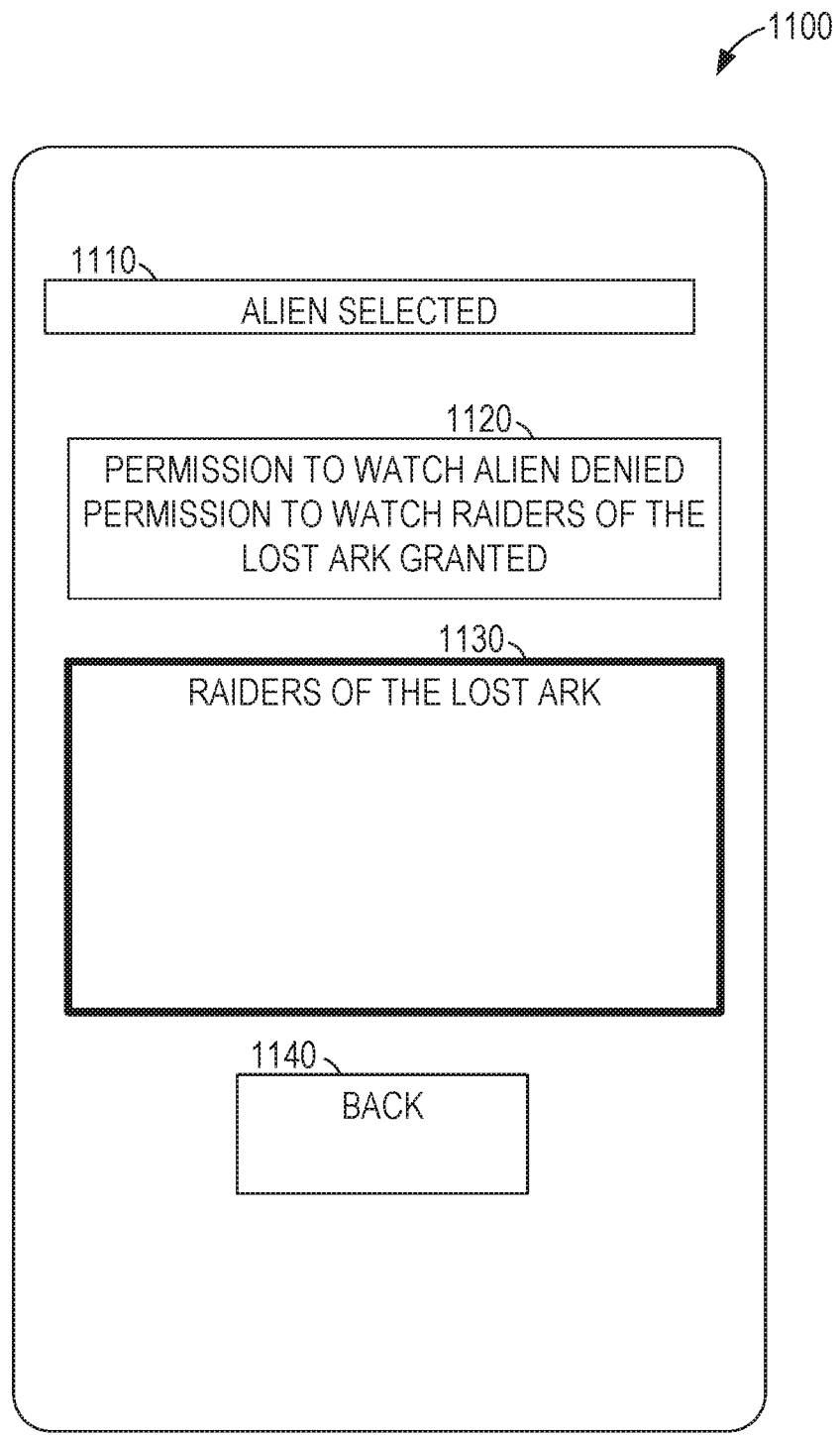
FIG. 11 is a user interface diagram illustrating a user interface suitable for viewing media content, according to some example embodiments.

FIG. 11 is a user interface diagram illustrating a user interface 1100 suitable for viewing media content, according to some example embodiments. The user interface 1100 may be presented on the child device 105 after operation of the button 750 (FIG. 7) on the parent device 120. The user interface 1100 includes a title 1110, "Alien Selected"; an informational message 1120; a viewing area 1130; and a button 1140. The informational message 1120 indicates whether or not authorization to view the requested media content item was granted and, if permission to view a different media content item was granted instead, identifies the authorized media content item. Since authorization was granted to watch Raiders of the Lost Ark instead of the requested Alien, the viewing area 1130 displays, or is operable to cause the display of, the replacement media content item, Raiders of the Lost Ark. The button 1140 is operable to return to the user interface 900 (FIG. 9).

Figures 12A, 12B:
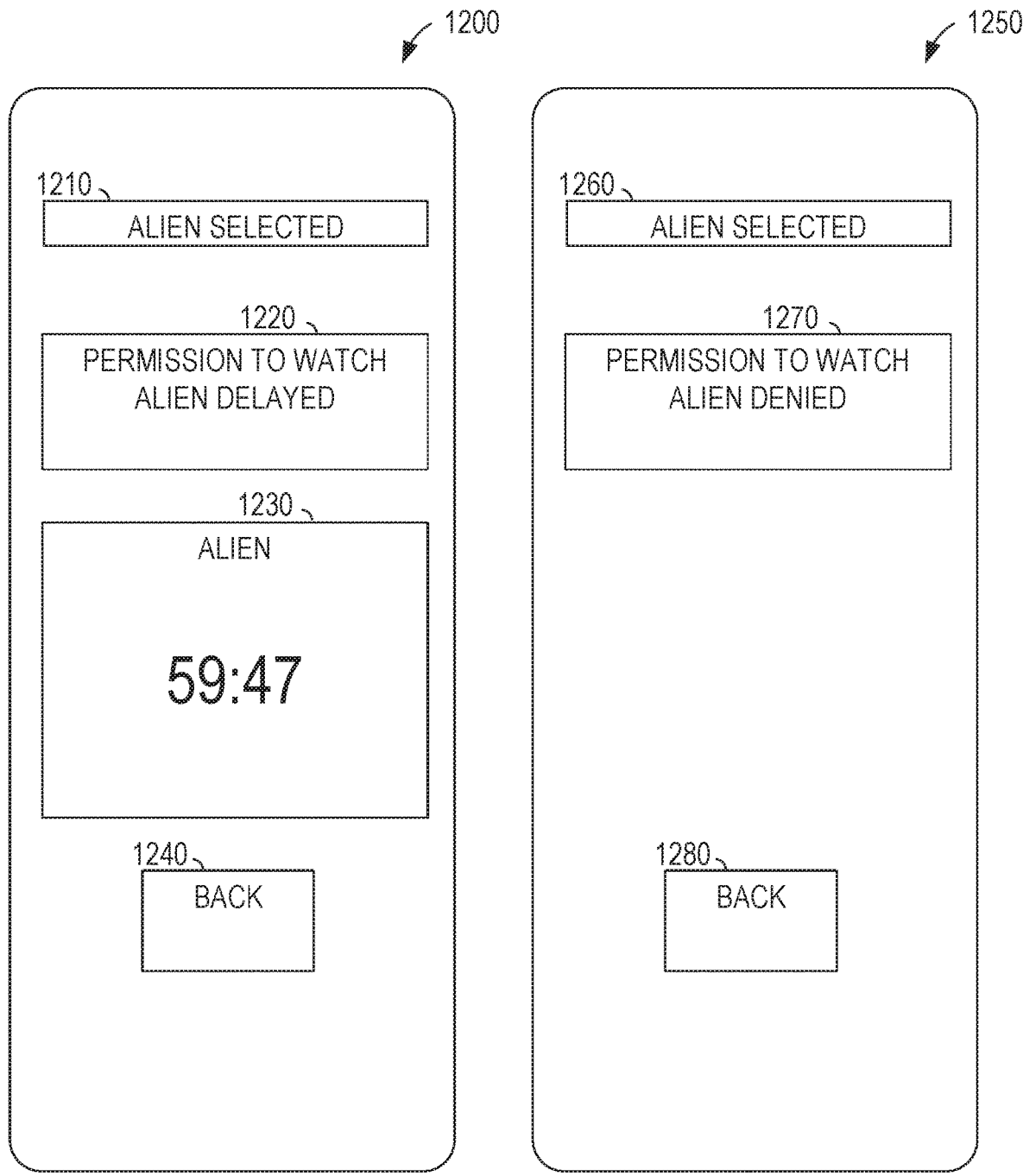
FIGS. 12A and 12B are user interface diagrams illustrating user interfaces suitable for delaying or denying viewing of media content, according to some example embodiments.

FIG. 12A is a user interface diagram illustrating a user interface 1200 suitable for delaying viewing of media content, according to some example embodiments. The user interface 1200 may be presented on the child device 105 after operation of the button 830 (FIG. 8) on the parent device 120. The user interface 1200 includes a title 1210, "Alien Selected"; an informational message 1220; a viewing area 1230; and a button 1240. The informational message 1220 indicates that permission to watch the requested media content item was granted, subject to a delay. Since the authorization was subject to a delay, the viewing area 1230 is not operable to display the requested media content item. In some example embodiments, the viewing area 1230 displays a timer that indicates the time remaining before viewing of the requested media content item can begin. After the expiration of the timer, the viewing area 1230 may be operable to cause playback of the selected media content item. The button 1240 is operable to return to the user interface 900 (FIG. 9).

FIG. 12B is a user interface diagram illustrating a user interface 1250 suitable for denying viewing of media content, according to some example embodiments. The user interface 1250 may be presented on the child device 105 after operation of the selectable option 550 (FIG. 5) on the parent device 120. The user interface 1250 includes a title 1260, "Alien Selected"; an informational message 1270; and a button 1280. The informational message 1220 indicates that permission to watch the requested media content item was denied. The button 1240 is operable to return to the user interface 900 (FIG. 9).

Figure 13:
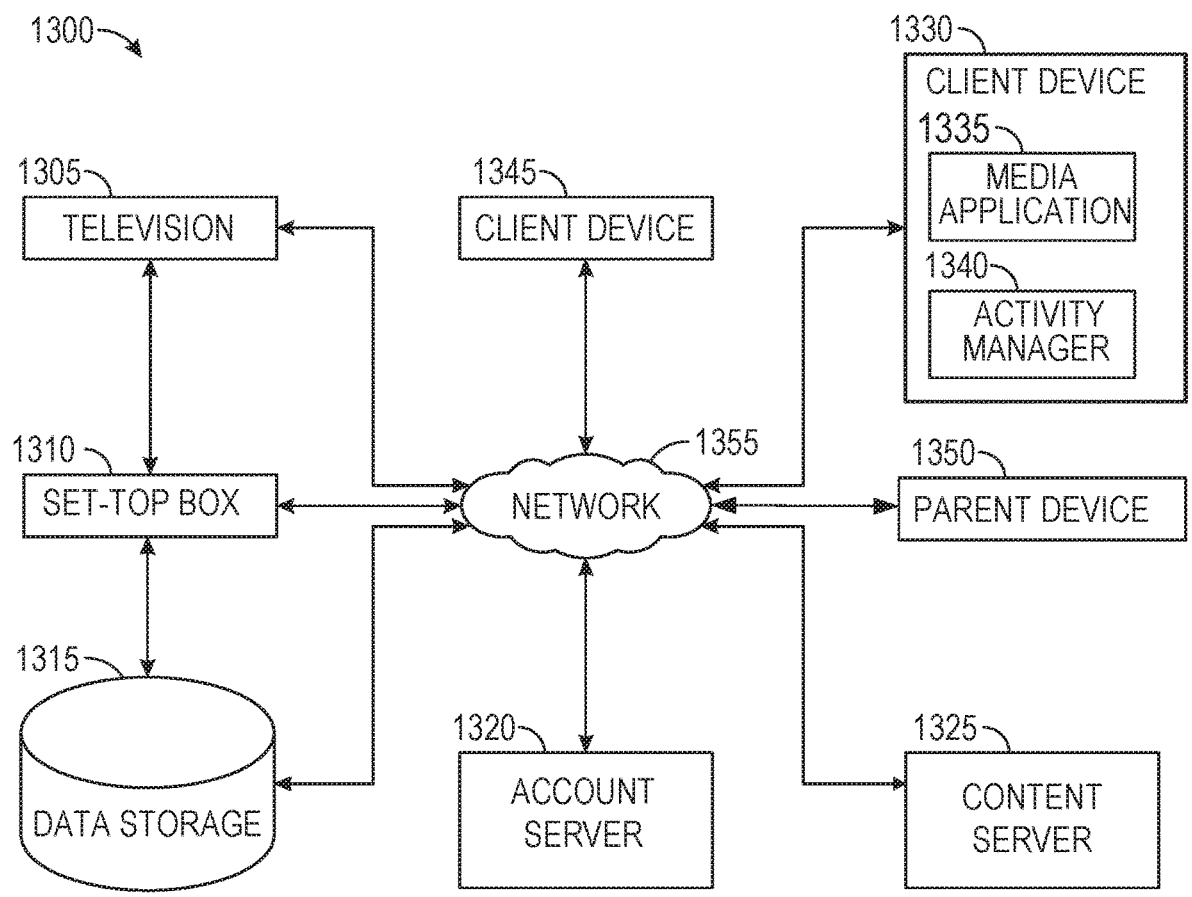
FIG. 13 is a block diagram of an example operating environment in which some embodiments may be implemented.

FIG. 13 illustrates a block diagram of an example operating environment 1300 in which some embodiments may be implemented, arranged in accordance with at least one embodiment described herein. The example operating environment 1300 may include a television 1305, a set-top box (STB) 1310, a client device 1330, a client device 1345, a parent device 1350, a network 1355, a content server 1325, a data storage 1315, and an account server 1320.

The television 1305 may include a device that is configured to present media content via a display device. For ease in explanation, "media content" may refer to video content, audio content, text content, image content, or a combination of at least two types of content. The media content may include an audio component that plays simultaneously with a video component. The media content may include an electronic file that may be executed or loaded using software, firmware, or hardware configured to present the content to a user via the television 1305, the STB 1310, and/or the client device 1330. Media content may also include live-streamed content and media items available on demand. The television 1305 may receive the media content from any source, such as from an over-the-air broadcaster, a satellite, a cable connection, a streaming device (e.g., the client device 1330), the content server 1325, or any other source capable of sending media content to the television 1305. The media content may include (or be supplemented with) one or more electronic advertisements. The electronic advertisements may advertise any product or service and may be received from any source.

The STB 1310 may include a device that is configured to convert video content to analog or digital TV signals. In at least one embodiment, the STB 1310 includes a satellite IV receiver or an over-the-air digital-to-analog converter. In at least one other embodiment, the STB 1310 may include a media hub that connects to a local network (e.g., the network 1355) for Internet access and may convert video from online media providers (e.g., Netflix®, Hulu®) into TV signals. The STB 1310 may also connect to and receive content from the client device 1330. The STB 1310 may send analog or digital signals to the television 1305 for playback. In at least one embodiment the STB 1310 is integrated with the television 1305.

The client device 1330 may include a computing device which may include, but is not limited to, a desktop computer, a mobile device, a laptop computer, a tablet computer, a mobile phone, a smart phone, a personal digital assistant (PDA), or another suitable computing device. The client device 1330 may include any number of applications that may enable a user to perform various tasks. In at least some embodiments, the client device 1330 may include an application (e.g., a media application 1335) that may send and receive communications to and from the STB 1310. The application may also include various advertisement and activity-tracking components. In at least one embodiment, the client device 1330 may include one or more sensors, receivers, and/or transceivers (not illustrated) that may be configured to detect activities. The sensors, receivers, and/or transceivers may include an audio sensor (e.g., a microphone, a wireless digital signal transceiver (e.g., Wi-Fi, Bluetooth, ZigBee, Z-Wave), a motion sensor (e.g., gyroscope, accelerometer, Global Positioning System (GPS) unit), and the like.

In general, the network 1355 may include one or more wide area networks (WANs) and/or local area networks (LANs) that enable the television 1305, STB 1310, client device 1330, client device 1345, parent device 1350, content server 1325, data storage 1315, and account server 1320 to communicate with each other. In some embodiments, the network 1355 includes the Internet, including a global internetwork formed by logical and physical connections between multiple WANs and/or LANs. Alternately or additionally, the network 1355 may include Bluetooth access points, wireless access points, one or more cellular radio frequency (RF) networks and/or one or more wired and/or wireless networks such as, but not limited to, 802.xx networks, Long-Term Evolution (LTE) or LTE-Advanced networks, Internet Protocol (IP)-based networks, or the like. The network 1355 may also include servers that enable one type of network to interface with another type of network.

The example operating environment 1300 may include any number of content servers 1325. The content server 1325 may include one or more computing devices (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components. The content server 1325 may provide media content (e.g., digital video, streaming video, images, digital music, streaming music, social media information, etc.) to the television 1305 and/or the STB 1310. To provide media content, for example, the content server 1325 may determine whether a user is permitted to access content selected by the user whether the user is a subscriber). The content server 1325 may also provide advertisements to the television 1305 and/or the STB 1310.

In at least one embodiment, the data storage 1315 may include a memory (e.g., random access memory), a cache, a drive (e.g., a hard drive), a flash drive, a database system, or another type of component or device capable of storing data. The data storage 1315 may also include multiple storage components (e.g., multiple drives or multiple databases) that may span multiple computing devices e multiple server computers). The data storage 1315 may store client device information, client device association information, information pertaining to one or more client devices being associated with one or more STBs, group information that includes one or more client devices that are associated with one or more STBs, one or more user profiles, one or more user accounts, one or more show schedules associated with one or more user accounts, recordings set by a user account, user watch histories, social activities (e.g., a like, a share), consumer activities (e.g., a purchase, a save, a watch, a listen Although each of the STB 1310 and data storage 1315 is depicted in FIG. 13 as a single, disparate component, these components may be implemented together in a single device or networked in various combinations of multiple different devices that operate together.

The example operating environment 1300 may include any number of account servers 1320. The account server 1320 may include one or more computing devices (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components. The account server 1320 may provide account information to the STB 1310. In at least some embodiments, the account server 1320 may cause the account information to be stored in the data storage 1315 or in another data storage. The account information may include one or more usernames, one or more subscription levels, one or more user accounts, information pertaining to one or more devices associated with each user account, location information pertaining to the one or more user accounts, etc. The STB 1310 may request the account information from the account server 1320. Additionally or alternatively, the account server 1320 may push the account information to the STB 1310.

The client device 1330 may include a media application 1335 that allows an end user to interact with the STB 1310 via the client device 1330. The media application 1335 may receive messages from the STB 1310. In response to the received messages, the media application 1335 may cause various user interface tools to be displayed on a display device at the client device 1330. In at least some embodiments, the user interface tools may be configured to provide at least one interactive notification. The user interface tools may include a tool configured to receive input via the client device 1330. For example, the STB 1310 may send an interactive notification to the client device 1330 that includes an instruction for the client device 1330 to present an on-screen or virtual keyboard. The client device 1330 may cause the virtual keyboard to be presented on the display device. The display device may include touch-sensitive features (e.g., a capacitive sensing system) configured to receive touch input from a user. The display device may, for example, receive keyboard input from the user. The client device 1330 may send the keyboard input to the STB 1310. The STB 1310 may use the keyboard input as input for an STB function, such as those illustrated in FIGS. 16, 17, 18, 19, 20, 21, and 22. For example, the STB function may include a search for various media items. Using the keyboard input received from the client device 1330, the STB 1310 may initiate a query. The STB 1310 may, for example, send the query to the content server 1325. The content server 1325 may send query results to the STB 1310, and the STB 1310 may cause the query results to be presented on the television 1305. In this manner, the client device 1330 may be used to receive input on behalf of the STB 1310.

In at least some embodiments, the media application 1335 may be used to select and/or view content on the television 1305 via the STB 1310. For example, the media application 1335 may be a web browser that may present a list of media content items to the end user. As a web browser, the media application 1335 may also access, retrieve, present, and/or navigate content (e.g., web pages such as Hypertext Markup Language (HTML) pages, digital media items, etc.) served by a web server. The media application 1335 may render, display, and/or present the list content to the end user. The media application 1335 may also provide an embedded media player (e.g., a Flash® player or an HTML5 player)

that is embedded in a web page (e.g., a web page that may provide information about a product sold by an online merchant). In another example, the media application 1335 may be a standalone application (e.g., a mobile application or mobile app) that allows users to consume digital media items (e.g., digital videos, digital images, electronic books, websites, etc.) and send various input to the STB 1310. The media application 1335 may be provided to the client device 1330 by the content server 1325 or via an application store. The media application 1335 may enable the client device 1330 to receive messages from the STB 1310. In at least some embodiments, when the media application 1335 is installed on the client device 1330, the STB 1310 may send messages to the client device 1330. The client device 1330 may present message as notifications, whether or not the media application 1335 is running in the foreground, running in the background, disabled, etc. In at least some embodiments, in addition to having the media application 1335 installed on the client device 1330, the STB 1310 may send messages to the client device 1330 while the client device 1330 and the STB 1310 are both on a same network. Additionally or alternatively, the STB 1310 may send a first type of messages to the client device 1330 while the client device 1330 and the STB 1310 are both on a same network and a second type of messages to the client device 1330 while the client device 1330 and the STB 1310 are not on a same network.

Initial Setup and Configuration

In at least some embodiments, a user may create a user account with a content provider, such as a cable TV provider. In at least some embodiments, the account server 1320 is associated with the content provider. To create the account, the user may, for example, navigate to a website and provide signup information to the content provider. In at least some embodiments, during a user account creation process, the user may identify one or more client devices to register with the content provider. The content provider may register such devices including a device identifier for each of the client devices with the user account. In at least some embodiments, the content provider may register a unique identifier (e.g., a universally unique identifier (UIDD)) of each client device with the user account. Additionally or alternatively, the user may provide an identifier. For example, a father may register his mobile phone with a description "Dad's phone," his wife's mobile phone with a description "Mom's phone," and a child's mobile device with a description "Child's device." The account server 1320 may store the identifiers of the various client devices in association with the user account in the data storage 1315. The content provider may also assign an STB to the user account and register an identifier for the STB in association with the user account. A record of the user account may include one or more STBs associated with the user account and one or more client devices associated with the user account. In at least some embodiments, one or more options or account preferences may be available to the user, such as an option to only send notifications or messages to a particular client device, device type, etc. In at least some embodiments, an option or preference may include a setting to select one or more client devices that may or may not receive notifications. For example, a user may set "Dad's phone" and "Mom's phone" to receive notifications and "Child's device" to not receive notifications.

In at least some embodiments, part of the user account creation process includes downloading the media application 1335 to the client device 1330. The media application 1335 may present a registration interface that may be configured to receive various information, such as user information, STB information, etc. Using the media application 1335, the user can initiate the user account creation process and associate the STB 1310 with the client device 1330. For example, using the media application 1335, the user can input an identifier of the STB 1310 (e.g., a media access control (MAC) address or another identifier of the STB). Either the STB 1310 or the client device 1330, or both, may send a validation message to the account server 1320, which may be associated with the content provider, to confirm association of the STB 1310 and the client device 1330.

In at least some embodiments, the STB 1310 may be initialized for use by the media application 1335. For example, the STB 1310 may be Wi-Fi-enabled and the media application 1335 may be used to provide network credentials to the STB 1310, as further described in conjunction with FIG. 21. The media application 1335 may also be used to adjust any of the STB 1310 configuration or settings, such as language selection, picture quality, resolution, etc. using the techniques described herein.

STB and Client Device in Operation

In operation, the STB 1310 may push a message to the client device 1330. The message may include a request for input. For example, the message may include a request for alphanumeric characters, haptic input, audible input, or any other type of input that may be received by the client device 1330. In at least some embodiments, the message may include a request for a particular type of input from the client device 1330 and/or an input method. For example, the message from the STB 1310 to the client device 1330 may include a request for a username and a password. The message may also include an instruction to retrieve the username via a text box and to retrieve the password from a text box where the characters of the password may be masked or disguised when they are provided to the client device 1330. Any type of input method may be used, such as a keyboard, numeric keypad, on-screen gesture, off-screen gesture, etc.

In an example embodiment, the STB 1310 may receive an input. For example, a user may use an STB remote to navigate through various graphical interfaces of the STB 1310. The user's navigation may arrive at an STB input field in a particular graphical interface of the STB 1310. The STB 1310 may determine whether the STB input field can be controlled or supplemented by a client device. The STB 1310 may identify available client devices. In at least some embodiments, the STB 1310 may check the network 1355 for available client devices that are also connected to the network 1355. Additionally or alternatively, the STB 1310 may check a user account for available client devices. In at least some embodiments, the STB 1310 checks a local storage for devices associated with the user account. The STB 1310 may query the account server 1320 for devices associated with the user account. If a client device is identified (e.g., the client device 1330), the STB 1310 may determine a communication mechanism by which to contact the client device 1330. The communication mechanism may include, for example, the network 1355 or another network. The STB 1310 may then send a message to the client device 1330 using the communication mechanism. The message may include an instruction for the client device 1330 to open a user interface on the client device 1330 that includes a client input field that corresponds to the STB input field at the STB interface. For example, when the STB input field relates to alphanumeric characters, the client input field may include a keyboard. The message may include an instruction for the client device 1330 to present a virtual keyboard on a display of the client device 1330. The user may provide user input to the client device 1330 via the client input field (e.g., by typing on the virtual keyboard). The client device 1330 may send the user input to the STB 1310. The STB 1310 may use the received user input to perform an operation, such as to initiate a search for one or more media items using the received user input as keywords for the search in the STB input field.

The message may include different instructions based on a type of STB input field and/or a number of STB input fields. For example, the message may indicate that an STB input field is a text box, a username field, a password field, and that the client device 1330 is to present a similar input field to the STB input field. Further, the message may indicate multiple input fields. For example, the message may indicate that the client device 1330 is to provide both a username field and a password field to receive user input. The client device 1330 may provide functionality for the user to toggle between two or more STB input fields without further interaction with the STB 1310.

In at least some embodiments, the STB 1310 may send the message to the client device 1330 in response to a triggering event. As in the above example, the triggering event may include the user's navigation that arrives at the STB input field in a graphical interface of the STB 1310. A selection of or a navigation to a text field may be a triggering event. Other triggering events may include a time, a user status, or a client device location, among others.

A time-based triggering event, for example, may include a scheduled time, such as a calendared time when a particular show begins. For example, the message may include a reminder that the show is about to begin and an instruction for the client device 1330 to provide an option, via a user interface at the client device 1330, to power on the STB 1310 and/or to tune a channel of the STB 1310 to a channel that is scheduled to broadcast the show.

A user status-based triggering event, for example, may be based on one or more past or current user activities and/or user characteristics. For example, the user status may include the user watching a show on the television 1305 and then an advertisement beginning to play. The playing advertisement may, for example, be for a different show. In response to the playing advertisement (the user status-based triggering event), the STB 1310 may send a message to the client device 1330 that includes an instruction for the client device 1330 to present an interactive notification for the user to set a recording for the different show. In another example, the advertisement may be for a new car. The message may include an instruction for the client device 1330 to present more information about the new car, including an option to sign up to test drive the new car at a local dealership. In another example, the user may be watching a show and a product placement advertisement may appear in the show. The message may include an instruction for the client device 1330 to provide more information about the product in the product placement advertisement, including price, description, how to buy, and a hyperlink to a store that sells the product. In this manner, a commercial is airing on the television 1305, the user may receive a notification that pops up on the client device 1330 to be able to act on that commercial.

In another example of a user status-based triggering event, the user may be watching a show on the television 1305 and may be nearing the end of the show. At a predetermined time before the end of the show (e.g., 30 seconds before), the STB 1310 may send the message to the client device 1330 with an instruction for the client device 1330 to present information for a different show to watch next. The client device 1330 can also present an interface tool that the user can activate to begin playback of the different show, which may include changing a channel to a different program. In an example, the user may be watching a baseball game. Based on the user watching the baseball game, and based on the user's past activities of frequently watching baseball games (and based on the user's subscription to a baseball fan content package), the STB 1310 may determine that the user may desire to continue to watch more baseball after the current game ends. Before the end of the current game, the STB 1310 may send a message to the client device 1330 with an instruction to present information for one or more other baseball games that may be currently airing. The client device 1330 may present one or more interface tools that can be activated by the user to select one of the one or more other baseball games to watch. The client device 1330 may send the user selection to the STB 1310, and the STB 1310 can change the channel to the other selected baseball game.

In another example of a user status-based triggering event, the user may be watching a particular show. The STB 1310 may identify one or more social contacts of the user, such as by querying a social network service or in the data storage 1315. The STB 1310 may identify a social contact from among the one or more social contacts of the user who is also watching the same show as the user, such as by querying the content server 1325 or the account server 1320 for a current watch status of social contacts of the user. The STB 1310 may send a message to the client device 1330 with an instruction to present the message to the user, where the message indicates that the social contact of the user is also watching the show. The STB 1310 can also instruct the client device 1330 to present a notification that asks the user if they would like to communicate with the social contact. The message may also include contact information for the social contact. The client device 1330 may present the contact information for the social contact in a display. The user may select the contact information to initiate a conversation with the social contact.

In the above examples of presenting an option on the client device 1330 to present particular media content, the account associated with the client device 1330 may lack permissions to cause the media content to be displayed. In response to a request by the client device 1330 to view the media content, the STB 1310 may send a message to the parent device 1350 to request authorization to present the media content. Thus, the request by the client device 1330 to cause the STB 1310 to present the media content causes the STB 1310 to begin execution of the method 300 or 350, described above with respect to FIGS. 3A-3B.

Client Device Presence Detection

The STB 1310 may use presence detection when sending messages to one or more client devices. When performing presence detection, the STB 1310 may determine a location of at least one of the client devices. The location of a client device may include an approximate location. The location of a particular client device may be a location of the particular client device relative to locations of other client devices.

To detect the presence of the client device 1330, the STB 1310 may use one or more location detection techniques, such as Bluetooth®, the Global Positioning System (GPS), tremors in a user holding the client device, or far-field voice, among other techniques.

In some example embodiments, the STB 1310 may determine a location of the client device 1330 based on identifying a Wi-Fi network to which the client device 1330 is connected. The STB 1310 may also determine the location of the client device 1330 based on a router or access point to which the client device 1330 is connected. In at least some embodiments, the client device 1330 may inherit a location from a network to which it is connected. For example, a network device (e.g., a modem, a router) may be associated with a particular external Internet Protocol (IP) address that is also associated with a geographic location. The client device 1330 may inherit the geographic location associated with the IP address of the network device.

In some example embodiments, the STB 1310 may use triangulation to determine the location of the client device 1330. For example, the STB 1310 may identify multiple points (e.g., three points or more points) of low-energy Bluetooth that allow the STB 1310 to triangulate or pinpoint here the client device 1330 is located within a room in relation to the STB 1310.

In some example embodiments, the STB 1310 may use tremor detection to determine an account associated with the client device 1330. A person may have a unique hand tremor pattern when they pick up a remote or client device 1330. The remote or client device 1330 may send a detected tremor pattern to the STB 1310. The STB 1310 may use the detected tremor pattern to determine the account of the person actually in control of the remote or client device 1330 at that time. In at least some embodiments, the STB 1310 may record tremor patterns over time in association with various activities, such as user registration, login, media item selection, etc. The STB 1310 may generate a tremor pattern profile, which may include using machine-learning techniques, and may associate that pattern with a particular user. The STB 1310 may store the tremor pattern profile in association with a user account of the particular user.

In some example embodiments, the STB 1310 may use far-field voice techniques to determine the location of the client device 1330. For example, the STB 1310 may periodically use far-field voice techniques to detect speech from a user who is near the STB 1310. In at least some embodiments, a remote for the STB 1310 may also turn on far-field voice at certain intervals to identify a voice. Identification of a particular voice may indicate that a user is near the STB 1310 and may be watching the television 1305. In at least some embodiments, the STB 1310 may check the detected voice against a database of voices to determine a particular user. In response to an identification of a particular user, the STB 1310 may identify a user account for the user and/or one or more client devices that are associated with the particular user or user account. For example, the STB 1310 may determine, based on the detected voice of the user, that the client device 1330 is associated with the user. The STB 1310 may send messages to the client device 1330 that may be directed or tailored to the user. In this way, a request for authorization by the client device 1330 to consume a media content item may be associated with a user account of the user of the client device 1330 without requiring the user to select the account or authenticate using other means (e.g., a username and password).

Presence may be determined at different levels. Four levels are described, but any number of levels may be used. A first level may be described as "associated with the account." At this level, one or more users may be associated with a single account with a content provider. The one or more users may be associated with one or more STB devices (e.g., the STB 1310) on the account. Each of the one or more users may have his or her own data within a personal profile. Each of the one or more users may have his or her own client device that is associated with the single account with the content provider. The STB 1310 may send messages to each of these client devices.

A second level may be referred to as a "location" level. The second level may build on the first level. Under this second level, a particular user may be at home (or at an alternate location), where his or her devices are connected, or are regularly used. A user may be deemed "at home" when the client device of the user is connected to his or her home Wi-Fi network. For example, detection of one or more of the client devices associated with the single account connected to the same network as the STB 1310 may indicate "presence" at the second level. Additionally or alternately, a geo-fence (or any other technology) which indicates particular behaviors which typically happen within a particular realm, such as the user watching short-form content on his or her commute to and from work, may indicate "presence" at the second level.

A third level may be indicative of an actual awareness of the user being in front of the television 1305 and/or STB 1310. The third level may build on the first level and/or the second level. This type of presence detection may be performed by far-field voice techniques, as described above, an STB camera, infrared detection techniques, facial recognition techniques, etc. to actually detect the user being proximate to the television 1305 and/or STB 1310. In another embodiment, the television 1305 may present content that includes a watermarked soundbite, such as a sound that is outside of the normal hearing range of a human. The client device 1330 may detect the watermarked soundbite and may send a message to the STB 1310 indicative of the client device's detection of the watermarked soundbite. The STB 1310 may use a receipt of this message to determine actual presence of the client device 1330.

A fourth level of presence detection may be referred to as "direct intent" For this level, a user may have explicitly indicated that he or she wants to take an action on the STB 1310 using the client device 1330.

In addition, the STB 1310 may use presence detection to determine a type of message to send to the client device 1330. For example, the STB 1310 may determine an identity of the user, recommendation data for the user, location data of the client device associated with the user, a proximity of the client device 1330 to the STB 1310, and current activity on the STB 1310, among other information, to send a message to the client device 1330. For example, the STB 1310 may determine the identity of the user, that the user likes luxury cars, that the user has recently searched the Internet for luxury cars, that the STB 1310 is currently playing a show that includes fast cars, and that the client device 1330 is proximate to the STB 1310. The STB 1310 may use this information to send a targeted message (e.g., a car advertisement) to the client device 1330.

In another example, the proximity of the client device 1330 to the STB 1310 may affect the messages that the STB 1310 sends to the client device 1330. For example, the STB 1310 may send information about what is currently playing in the television 1305 when the client device 1330 is nearby. When the client device 1330 is not close to the STB 1310 or connected to a different network than the STB 1310, the STB 1310 may send other information, such as promotional information. The STB 1310 may also change the context of the promotional information based on a user's location or proximity to the STB 1310.

The client device 1330 may include an activity manager 1340 to identify one or more activities of the user and/or the client device 1330. Example activities may include being exposed to an advertisement, a movement (e.g., movement of a physical location or position), a consumer activity (e.g., browsing webpages, making a purchase), a disinterested activity (e.g., an activity that may indicate a low level of user interest in an advertisement), etc.

In an example pertaining to the activity manager 1340 detecting a movement activity, the example operating environment 1300 may include an area. The area may be geographically defined, such as by a building, a room within the building, etc. In at least one embodiment, the area may be defined by an audio-video content-based characteristic, a characteristic of the television 1305, and/or a sensor of the client device 1330. For example, the area may be defined by a current volume level of audio-video content that is playing on the television 1305, as detected by a microphone of the client device 1330. The client device 1330 may move into and out of the area. The activity manager 1340 may determine when the client device 1330 moves into and out of the area. For example, when the client device 1330 moves far enough away from the television 1305 that the microphone no longer detects sound from the television 1305 (or the detected sound falls below a sound threshold), then the activity manager 1340 may determine that the client device 1330 may have moved outside of the area. In at least one embodiment, the activity manager 1340 may use a detected volume level to determine a user's distance from the television 1305. The activity manager 1340 may send information about movements of the client device 1330 inside and outside of the area to the STB 1310.

In another example, the client device 1330 may connect to the STB 1310 via a wireless link, such as a Bluetooth® link. The wireless link may be disconnected when the client device 1330 moves further than a threshold distance away from the STB 1310. In at least one embodiment, a wireless radio may be configurable to cover a user-selected distance. The STB 1310 may detect that the connection to the client device 1330 has been lost in response to the connection being disconnected.

In at least one embodiment, the example operating environment 1300 may include multiple client devices, for example another client device 1345. The STB 1310 may detect client devices (e.g., the client device 1330 and the client device 1345) that may be in or near the area. The STB 1310 may detect a first user profile associated with the client device 1330 and a second user profile that is associated with the client device 1345. For example, the STB 1310 may detect a device identifier (e.g., MAC address, UUID) for each client device and then determine that a first UUID of the client device 1330 is associated with the first user profile and a second UUID of the client device 1345 is associated with the second user profile. The STB 1310 may send messages to the client device 1330 based on the first user profile. The STB 1310 may send messages to the client device 1345 based on the second user profile.

Additionally, the presence information for additional user accounts (e.g., presence of the client device 1345, associated with a different user account than the client device 1330, presence of a second user by voice recognition of multiple people in proximity to the client device 1330, or any suitable combination thereof) may be used in generating a recommended response to an authorization request for the parent device 1350. For example, if the authorization request is made by a first account associated with an age of 17, but the presence of a person associated with a second account associated with an age of 6 is determined, the recommended response may be based on the lower age of the second account, based on prior responses for the second account, or any suitable combination thereof.

The STB 1310 may also perform presence detection for multiple client devices. The STB 1310 may send messages to each of the client devices. For example, "Dad's phone," "Mom's phone," and "Child's device" are each detected by the STB 1310. The STB 1310 may send messages to each of these client devices.

In at least some embodiments, the STB 1310 may send messages to fewer than all of the detected client devices. The STB 1310 may use presence detection to determine which of the client devices to send messages to. For example, the STB 1310 may determine which of the client devices is closest to the STB 1310 and send messages only to that client device. In at least some embodiments, the STB 1310 may determine that "Dad's phone" is the primary client device on a single account, and the STB 1310 may select "Dad's phone" as the recipient of the STB messages.

In another example, the STB 1310 may determine how long it has been since the media application 1335 was opened on the client device 1330. In at least some embodiments, the STB 1310 may request that the client device 1330 send this information. In at least some embodiments, the client device 1330 may send this information to the STB 1310 without receiving a request for the information from the STB 1310. For multiple detected client devices, the STB 1310 may determine which client device has recently opened the media application 1335. For example, if a first client device has the media application 1335 running and the other client devices have not had it activated in a few days, then it is more likely that the first client device is associated with a person who is currently consuming content. The STB 1310 may select the first client device and send messages to the first client device.

In some example embodiments, the STB 1310 may determine a presence detection score for the client device 1330. The presence detection score may be indicative of how close to the STB 1310 the client device 1330 may be. The presence detection score may also account for an identity of the user associated with the client device 1330. The presence detection score may indicate that the client device 1330 (and a user of the client device 1330) is likely to be near the STB 1310 and that the user of the client device 1330 is likely to be sitting down and watching content on the television 1305 or interacting with the client device 1330. The presence detection score may be used to select one or more client devices from a group of available client devices. For example, the STB 1310 may determine a score for each of the client devices 1330, 1345 and may select one of the client devices 1330, 1345 based on the scores of the client devices 1330, 1345.

Modifications, additions, or omissions may be made to the example operating environment 1300 without departing from the scope of the present disclosure. Specifically, embodiments of the example operating environment 1300 are depicted in FIG. 13 as including one television 1305, one STB 1310, one network 1355, one content server 1325, one data storage 1315, and one account server 1320. However, the present disclosure applies to an example operating environment 1300 including one or more televisions 1305, one or more STBs 1310, one or more networks 1355, one or more content servers 1325, one or more data storages 1315, one or more account servers 1320, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

In situations in which the systems discussed here collect personal information about users, or may make use of personal information, the users may be provided with an opportunity to control whether the systems discussed collect user information (e.g., information about a user's social network, social actions or activities, profession, preferences, or current location), or to control whether and/or how to receive content from the content server 1325 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the systems discussed.

Figure 14B:
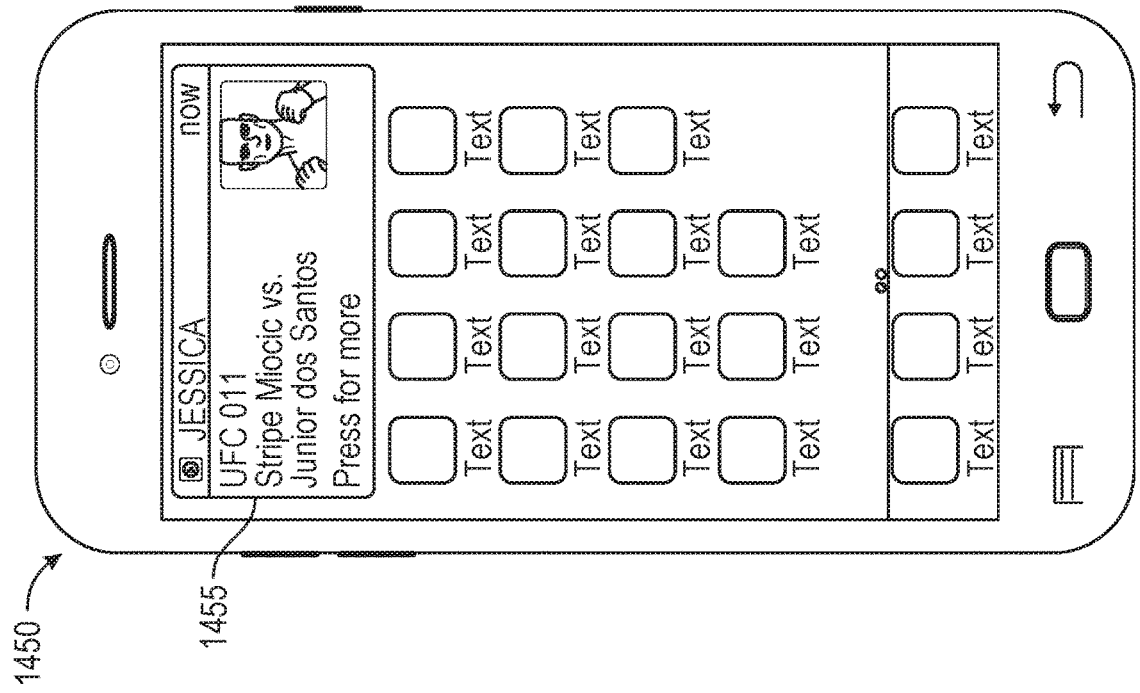
FIG. 14B illustrates a GUI with a notification on a client device when the client device is in use.
Figure 14A:
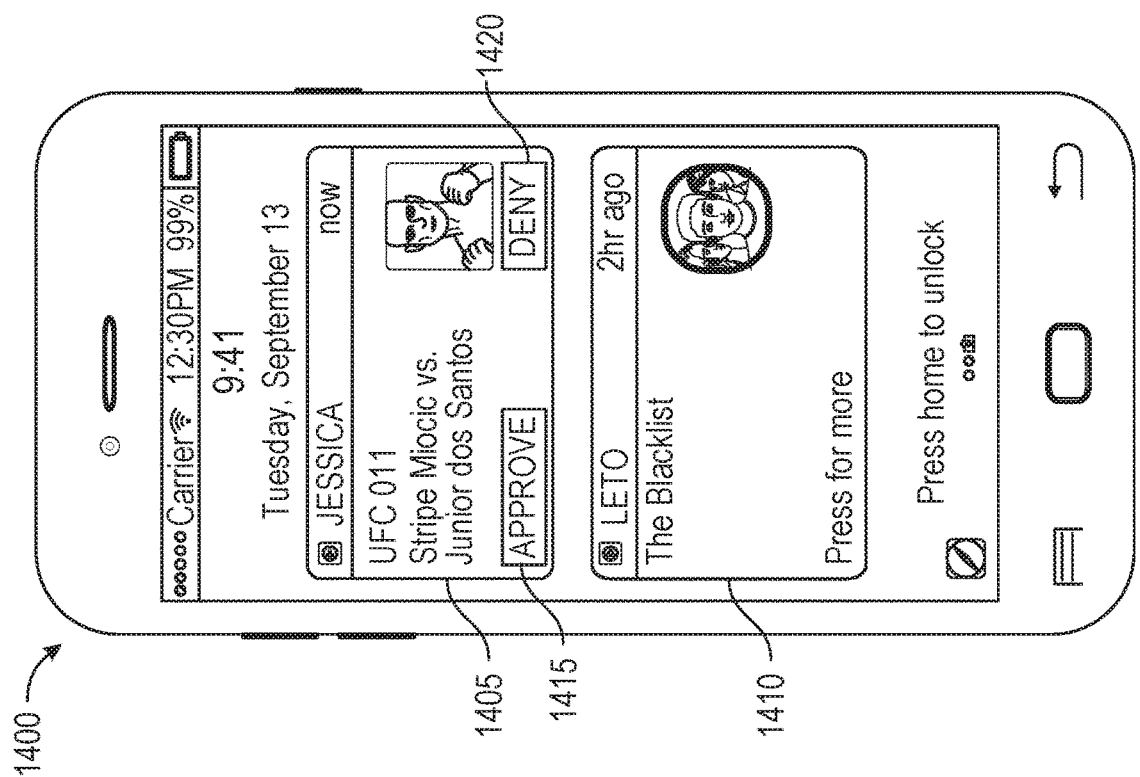
FIG. 14A illustrates an example client graphical user interface (GUI) with at least one message received from a secondary device.

FIG. 14A illustrates an example client graphical user interface (GU) 1400 with at least one message received from a secondary device. In response to an action of the secondary device (e.g., the STB 1310 of FIG. 13) or an action by a user (e.g., making a selection, entering a text box), the secondary device can send a message (e.g., a notification) to a client device (e.g., the client device 1330 of FIG. 13). As illustrated, the GUI 1400 illustrates two notifications 1405 and 1410 on the client device on a lock screen. The notification 1405 includes buttons 1415 and 1420.

A message may include an application name, a small icon, a small image, and a short message. A message can be used both when a client device is locked and when it is in use. The notification 1405 indicates a name of a child requesting permission to view an item of media content. In the particular example shown, the child is Jessica and the item of media content being requested is UFC 011. The button 1415 is operable by the user of the GUI 1400 (e.g., by a user of the parent device 120 of FIG. 1) to approve the viewing of the media content item by the child. The button 1420 is operable by the user of the GUI 1400 to deny the viewing of the media content item by the child. The remainder of the notification 1405 is operable by the user of the GUI 1400 to cause display of the UI 500 of FIG. 5, providing additional information and options regarding the requesting child and the requested media content item.

FIG. 14B illustrates a GUI 1450 with a notification 1455 on the client device when the client device is in use.

The secondary device may send a message to the client device at any time, such as when a content provider pushes notifications about special events or promotions, when a content provider generates various recommendation notifications (e.g., a live sporting event), and when a user has previously set a show reminder, among other scenarios. In at least one embodiment, a user swipe to the right may dismiss the notification and a swipe to the left may cause a launch of a media card.

Figure 15:
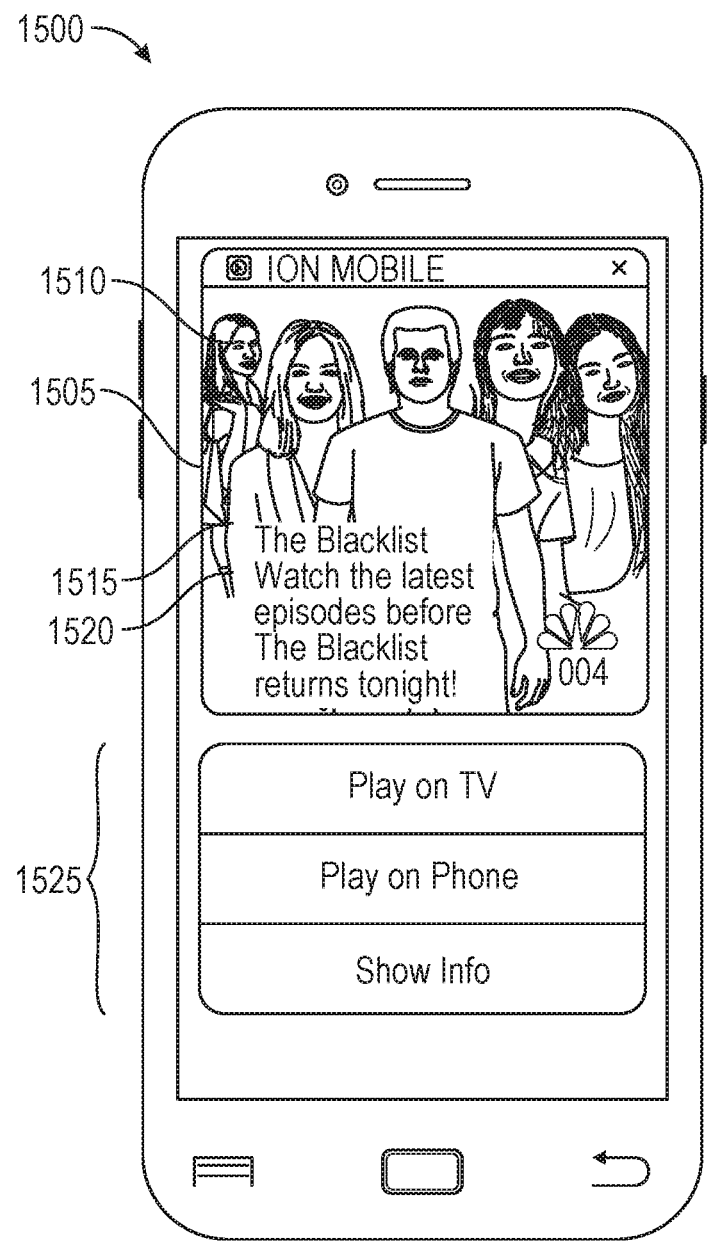
FIG. 15 illustrates an example GUI with an action sheet for a media item.

FIG. 15 illustrates an example GUI 1500 with an action sheet 1505 for a media item. The action sheet 1505 may, for example, include a show image 1510, a show title 1515, one or more lines of show description or a promotional message from a notification 1520, action options 1525, a network logo, a channel number, etc. In at least one embodiment, a black gradient mask may be applied over the show image 1510 to enhance legibility of text information.

Some client devices may be force-click enabled, which may allow a user to use force to activate different options in a GUI. When a notification is force-clicked, the action sheet may be revealed. An example behavior in this state may include a force-click to get options to "Play on TV" (which may be enabled by the STB if the client device and STB are near each other), "Play on Phone," and "Show Info," which may launch a media card. Another example behavior in this state may include a force-click to get options to "Play on Phone" (such as when the STB is off or when the client device is not near the STB) and "Show Info." A user tapping on "Play on TV" may send a message to the STB to cause the show to play on a television (e.g., the television 1305 of FIG. 13). A user tapping on "Show Info" may launch into that item's media card on the client device or on the television via the STB.

Figure 16:
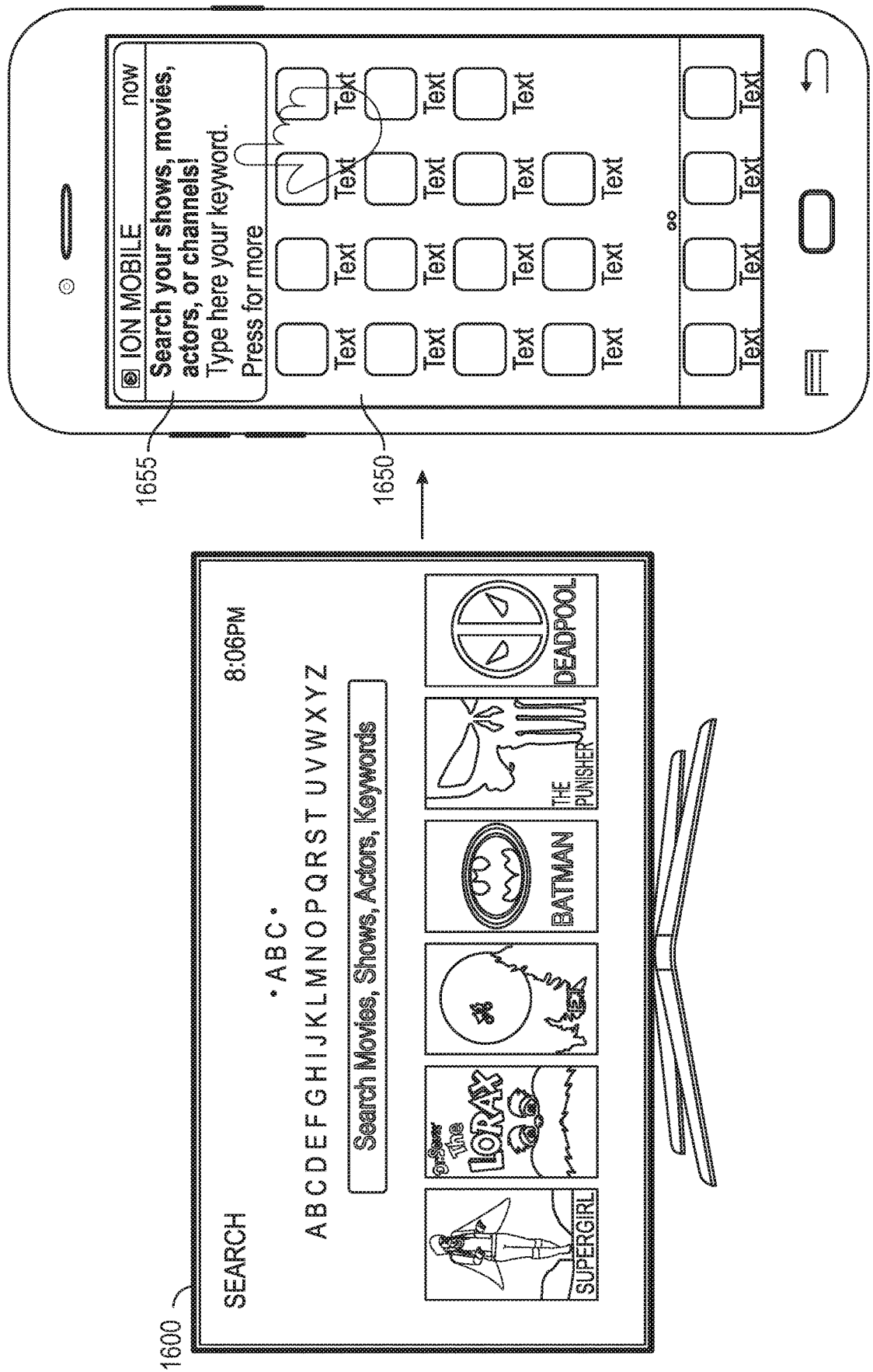
FIG. 16 illustrates an example set-top box search GUI and an example client GUI.

FIG. 16 illustrates an example STB search GUI 1600 and an example client GUI 1650. When the STB and client device are near, such as when the STB and client device are connected to the same network, a user can use a mobile application on the client device as an input for the STB.

In an example, a user may be using an STB remote to navigate through the STB GUI. The user may navigate to the STB search GUI 1600. In response to the user navigating to the STB search GUI 1600, the STB may send a message to the client device indicative of the current state of the STB being at the STB search GUI 1600. The message may also include an instruction for the client device to present a client search GUI, which may include one or more input boxes and/or a virtual keyboard.

The client device may display some or all of the message in a notification 1655. The notification 1655 may include text to let the user know that he or she may control the STB and/or provide input to the STB via the client device. Upon activation of the notification 1655, the client device may present a virtual keyboard.

FIG. 17 illustrates the example client GU 1650 of FIG. 16 and an example client search GUI 1700. The example client search GUI 1700 may include a search input box 1705 and a virtual keyboard 1710 that may be used to provide input to an STB. The example client search GUI 1700 may be presented in response to a long press by a user on a touch screen of the client device. Various behaviors of the virtual keyboard 1710 may be as follows: tapping on any key may input the applicable alphabetic or special characters to the client device and may cause a display of the same result on the search text input box on the STB, tapping on the "Enter" key may display "OK" or an applicable label while a confirmation is also displayed on the STB, tapping on a "Cancel" icon within the text entry box may delete characters and reset the text entry box, and tapping a "Close" icon may dismiss the virtual keyboard 1710. In at least one embodiment, search results may be displayed on the STB and not on the client device. Alternatively or additionally, search results may be displayed on both the STB and the client device. The virtual keyboard 1710 may include an "Enter," "Done," or similar button that, when activated, causes the STB to perform or confirm an action. If the user takes over control of the STB, such as via an STB remote, the STB can send a message to the client device to dismiss the virtual keyboard 1710.

FIG. 18 illustrates the example client GUI 1650 of FIG. 16 and another example client search GUI 1800. The example client search GUI 1800 may include a search input box 1805 and the virtual keyboard 1710 that may be used to provide input to an STB. The example client search GUI

1800 may be presented in response to a tap by a user on a touch screen of the client device.

Figure 19:
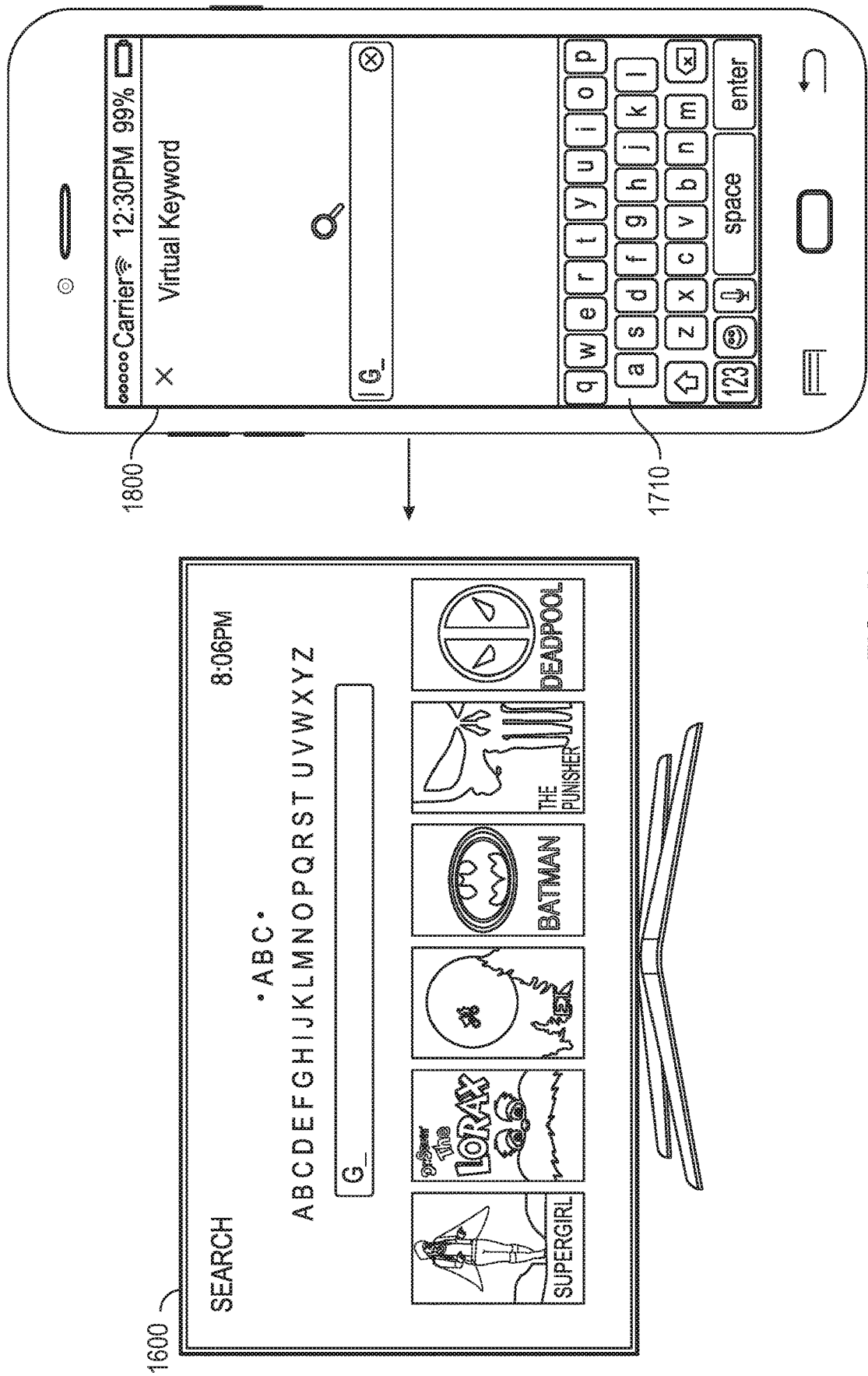
FIG. 19 illustrates another example client user interface with a virtual keyboard that simultaneously updates a user interface associated with a set-top box.

There may be multiple ways to activate the virtual keyboard 1710 depending on button behavior, such as a force-click (e.g., on press, on hold) or tapping a notification within a media application. For example, a user receives the notification 1655 on his or her client device when he or she navigates to the STB search GUI 1600 as illustrated in FIG. 16. Selecting the notification 1655 may activate the virtual keyboard 1710, as illustrated in FIGS. 17 and 18. As the user provides input to the client device via the virtual keyboard 1710, the text input may simultaneously appear on the STB search GUI 1600 and the client search GUI 1800 as illustrated in FIG. 19.

Figure 20:
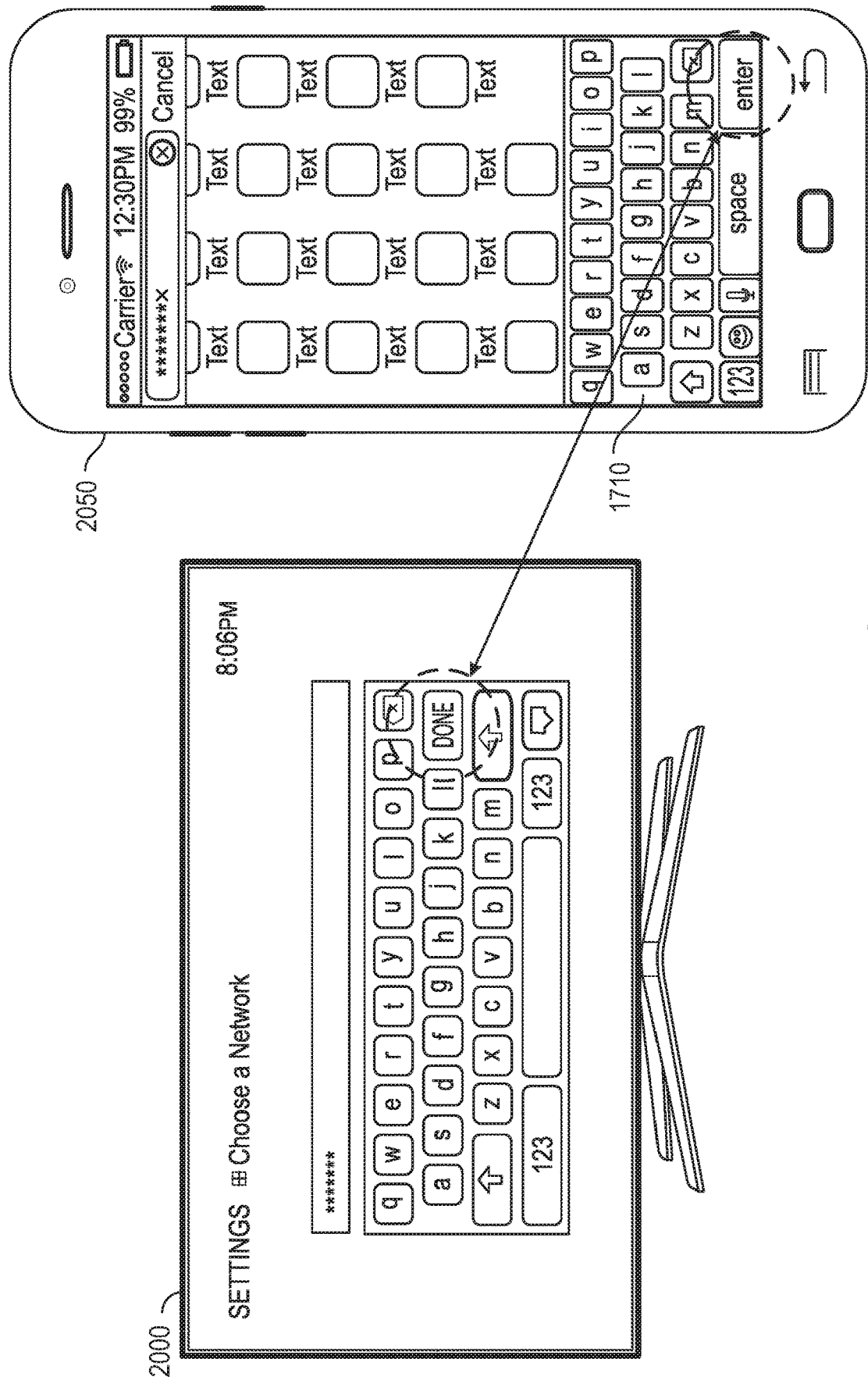
FIG. 20 illustrates an example set-top box password GUI and an example client password GUI.

FIG. 20 illustrates an example STB password GUI 2000 and an example client password GUI 2050. For example, the STB password GUI 2000 and the client password GUI 2050 may request a password from the user. In an example, a user may navigate to the STB password GUI 2000 that requests a user password. In response to the user navigating to the STB password GUI 2000, the STB may send a message to the client device. The client device may display a notification of the message. A user may respond by tapping on the notification. In response, the client password GUI 2050 may present the virtual keyboard 1710. The user tapping on any key may type the applicable alphabetic or special character on the client device. The typed characters may be presented on the STB password GUI 2000. In at least some embodiments, the STB password GUI 2000 and the client password GUI 2050 may mask or obscure characters that have been entered into the password field. After the user enters the password, an "Enter" label on the virtual keyboard 1710 as well as on the STB password GUI 2000 may switch to "Done." The user tapping on "Done" may dismiss the client password GUI 2050 and the STB password GUI 2000, and then advance to another GUI on the STB.

FIG. 21 illustrates an example STB GUI 2100 for username and password entry and a corresponding client GUI 2150 for username and password entry. The STB GUI 2100 may include two or more input fields. As illustrated, the STB GUI 2100 includes a username input field 2105 and a password input field 2110. The username and password may comprise network credentials, used to access a network. The client GUI 2150 includes the virtual keyboard 1710, a username input field 2155, and a password input field 2160. As discussed, text entered at the client GUI 2150 may be simultaneously presented at the STB GUI 2100.

Figure 22:
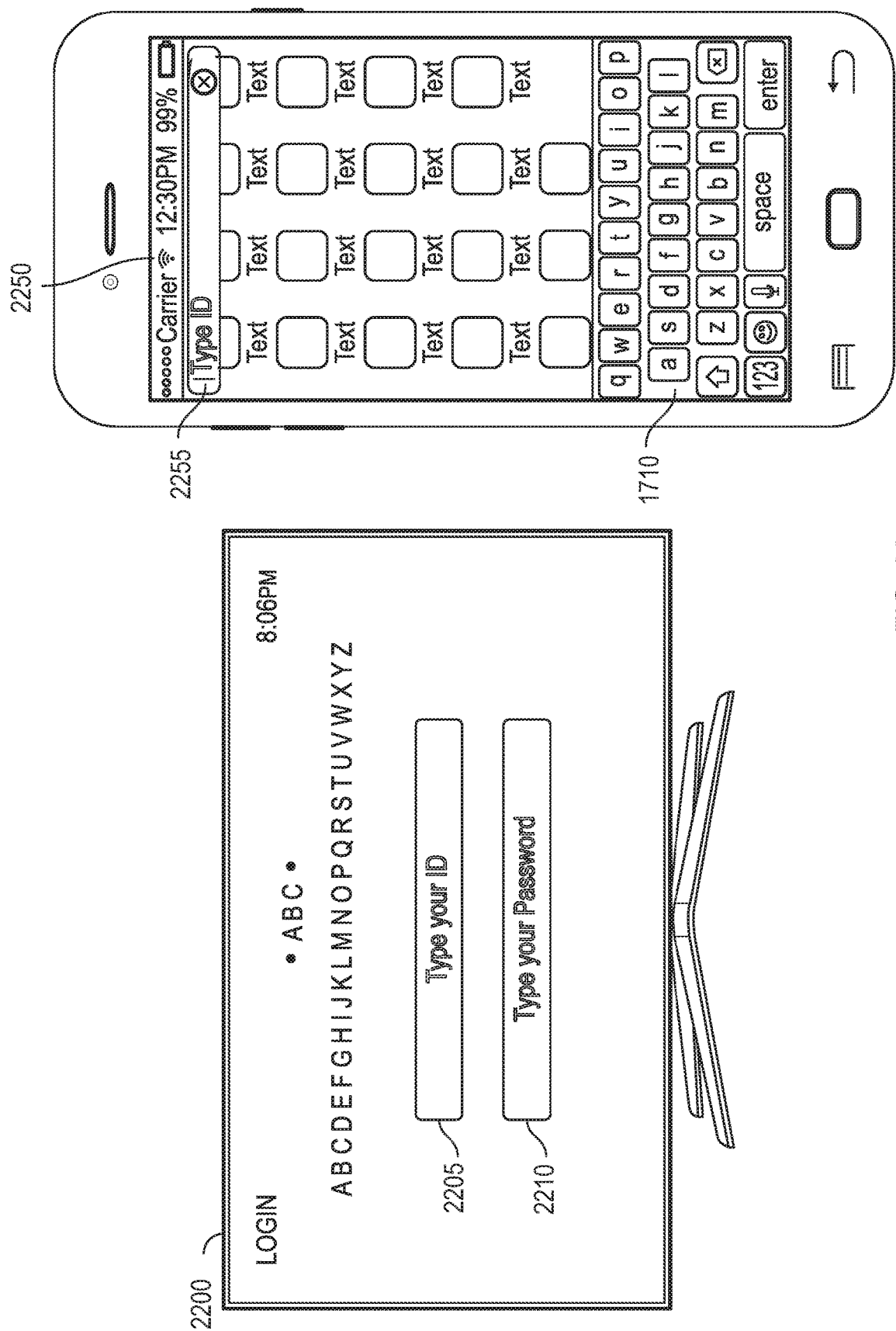
FIG. 22 illustrates another example set-top box GUI and corresponding client GUI.

FIG. 22 illustrates another example STB GUI 2200 and corresponding client GUI 2250. The STB GUI 2200 may include two or more input fields. As illustrated, the STB GUI 2200 includes a username input field 2205 and a password input field 2210. The client GUI 2250 may include a single input field 2255 and the virtual keyboard 1710. The user may toggle between the username input field 2205 and the password input field 2210 and may enter text into the username input field 2205 and the password input field 2210 using the single input field 2255.

FIG. 23 illustrates an example client GUI 2300 with a widget 2305 that can receive input for a set-top box. The widget 2305 may include show art, a play icon, a show title, time info, a network logo, and a channel, among other items. The client device may display the widget 2305, for example, when a content provider pushes a message that includes information about the show, special events or promotions, a group of recommended items, or a static category recommendation (such as "prime time" or trending, etc.), among others. The widget 2305 may display multiple content items, each clickable to play the content item on the STB and/or on the client device. The widget 2305 may be expanded by the user to show more content or other categories. The example client GUI 2300 illustrates the widget 2305 in a collapsed mode. FIG. 23 also illustrates another example client GUI 2350 including a widget 2355 in an expanded mode.

Figure 24:
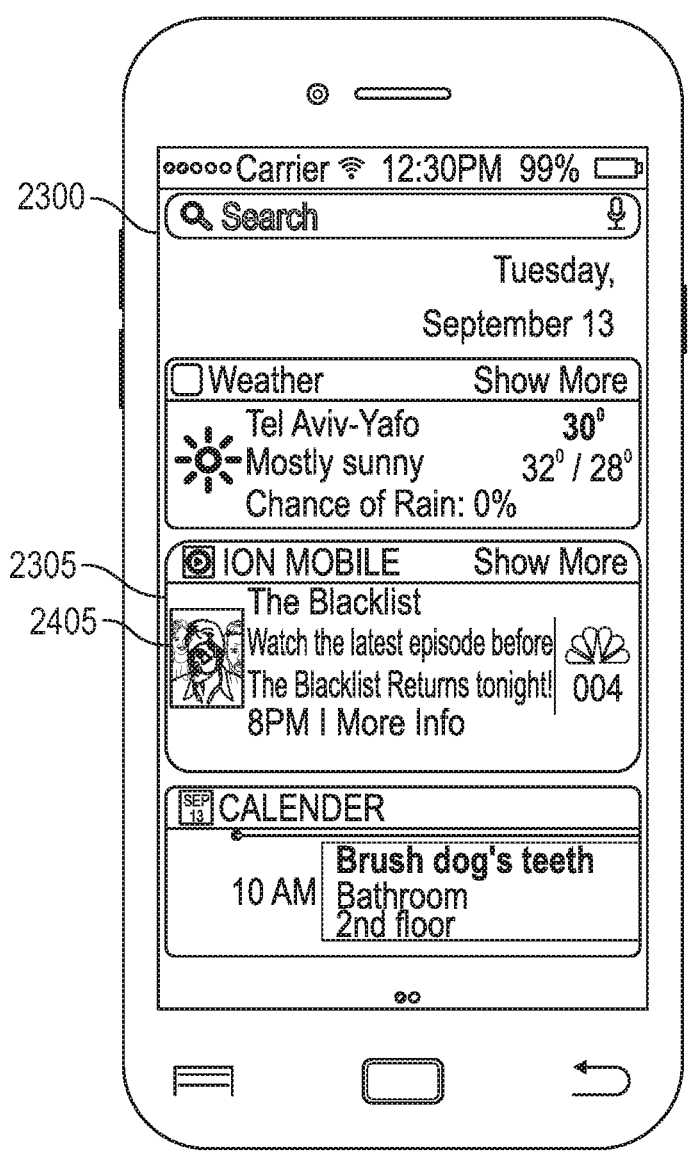
FIG. 24 illustrates the example client GUI with the widget and different regions that may include activation tools.

FIG. 24 illustrates the example client GUI 2300 with the widget 2305 and different regions that may include activation tools that may be activated. Any number of regions may include activation tools. As illustrated, the widget 2305 includes an activation tool 2405. Activation behaviors for the widget 2305 may include the user tapping the activation tool 2405 (which is illustrated with a "Play" icon superimposed on an icon representing an item of media content), which may initiate playback of the widget content on the STB if the STB is on. If the widget content video is not available, then a selection of the activation tool 2405 may cause the client device to launch an interface into that item's media card (e.g., for a future event or a scheduled event here the user has previously set up a reminder). The user tapping the activation tool 2405 may open a media player and play back the widget content if the STB is off. Whether the STB is on or off, use of the activation tool 2405 may initiate a request for authorization to play the widget content. The widget 2305 may also include a "Show More" option. A user can click on "Show More" on the widget 2305, which may cause the widget to expand to the bottom and reveal more contents.

Figure 25B:
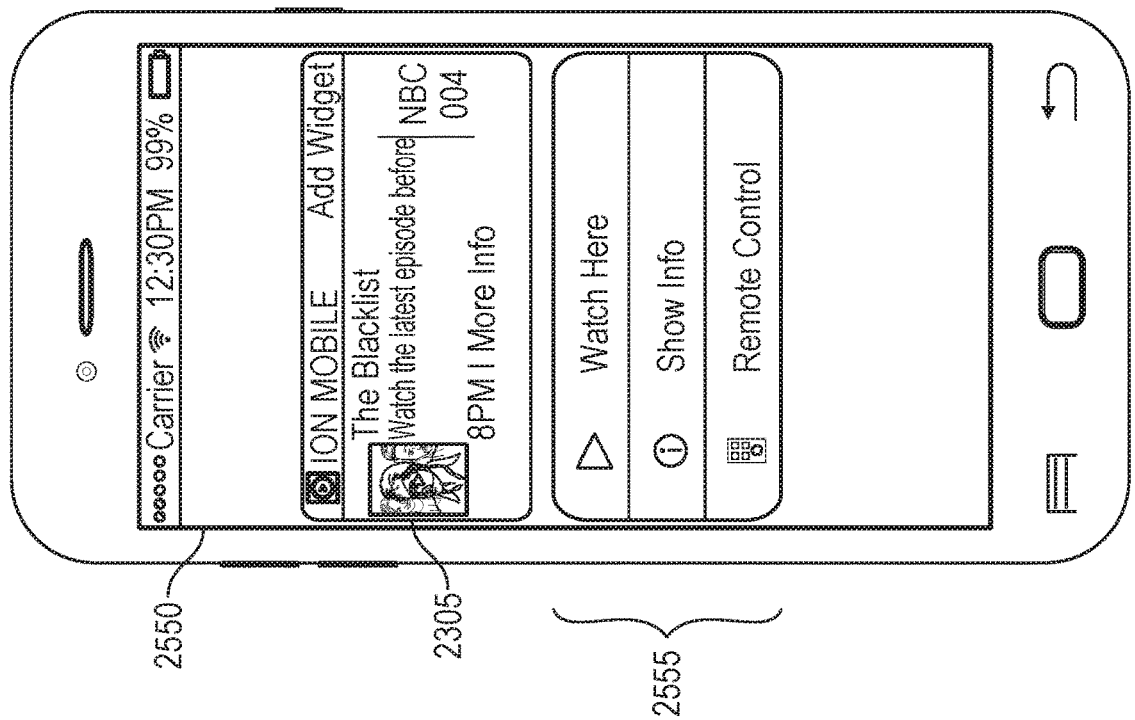
FIG. 25B illustrates an example client GUI that includes a widget and different selectable options where the client device is not close to a set-top box.
Figure 25A:
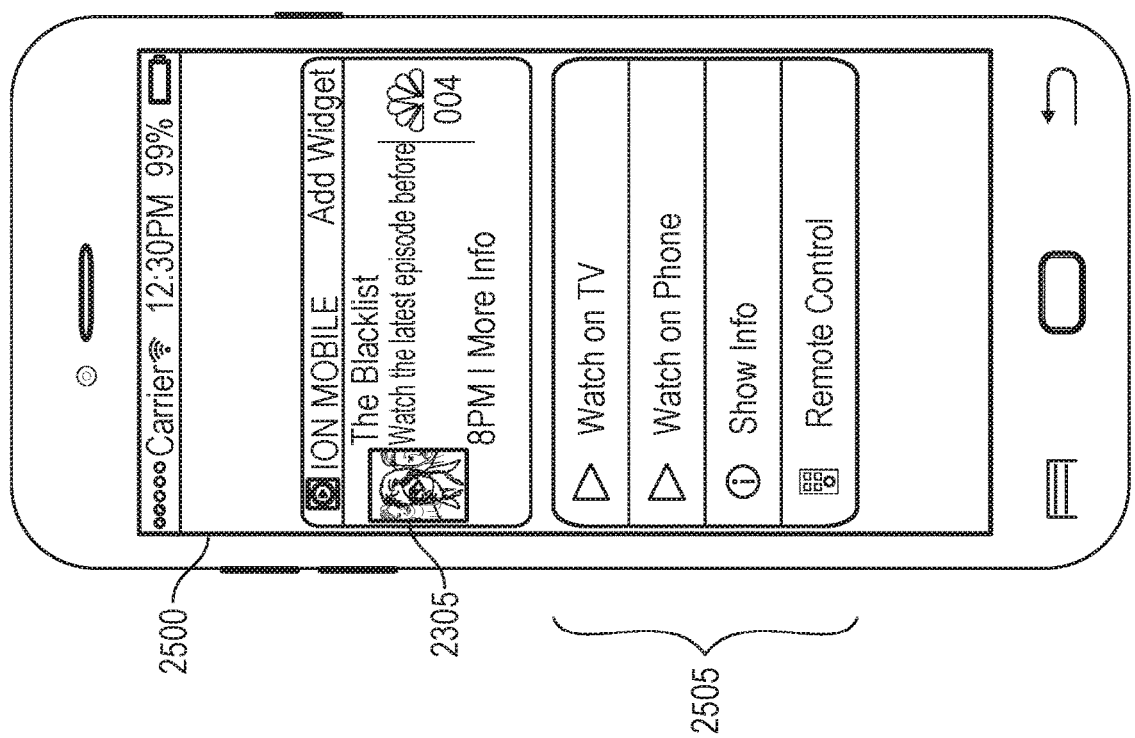
FIG. 25A illustrates an example client GUI that includes a widget and different selectable options.

FIG. 25A illustrates an example client GUI 2500 that includes the widget 2305 and different selectable options 2505. The widget 2305 may be activated with force-activated inputs. Upon activation of the widget 2305, such as with the activation tool 2405, or another activation tool (e.g., the "Show More" activation tool on the widget 2305), the client GUI 2500 may present the different selectable options 2505. When the STB is on and playing content, the different selectable options 2505 may include a "Watch on TV" option, a "Watch on Phone" option, a "Show Info" option, and a "Remote Control" option. Other selectable options may be used. Behaviors may include the user tapping "Watch on TV" which may cause the STB to play back the show, tapping "Watch on Phone" which may cause the client device to play back the show, tapping "Show Info" to view more information about the show, and tapping "Remote Control" to launch a remote control interface. Any of these requests to play back the show may instead initiate a request for authorization to play back the show.

FIG. 25B illustrates an example client GUI 2550 that includes the widget 2305 and different selectable options 2555 where the client device is not close to the STB. The different selectable options 2555 may include a "Watch Here" option, a "Show Info" option, and a "Remote Control" option. Other selectable options may be used. Behaviors may include the user tapping "Watch Here" which may cause the client device to play back the show, tapping "Show Info" to view more information about the show, and tapping "Remote Control" to launch a remote control interface. A request to cause the client device to play back the show may instead initiate a request for authorization to play back the show.

Figure 26:
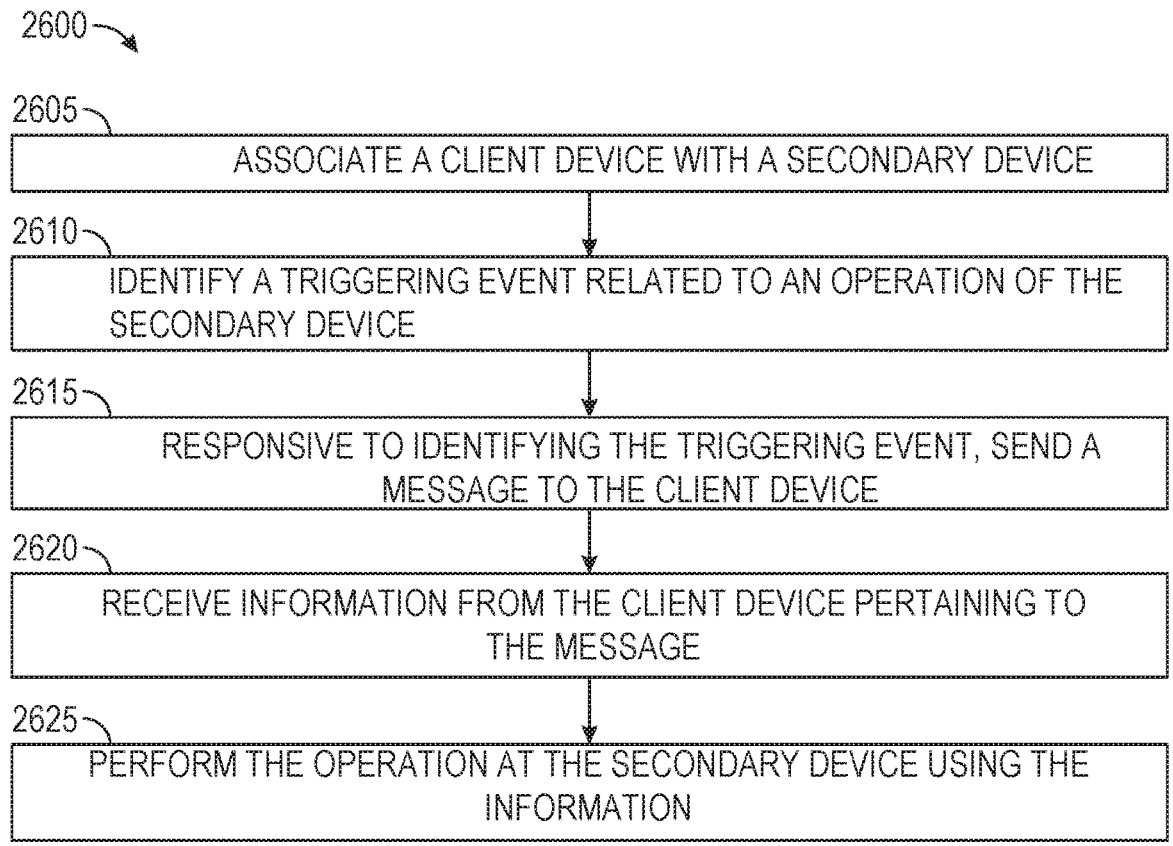
FIG. 26 illustrates an example flow diagram of a method for a set-top box to send and receive messages to and from a client device.
Figure 27:
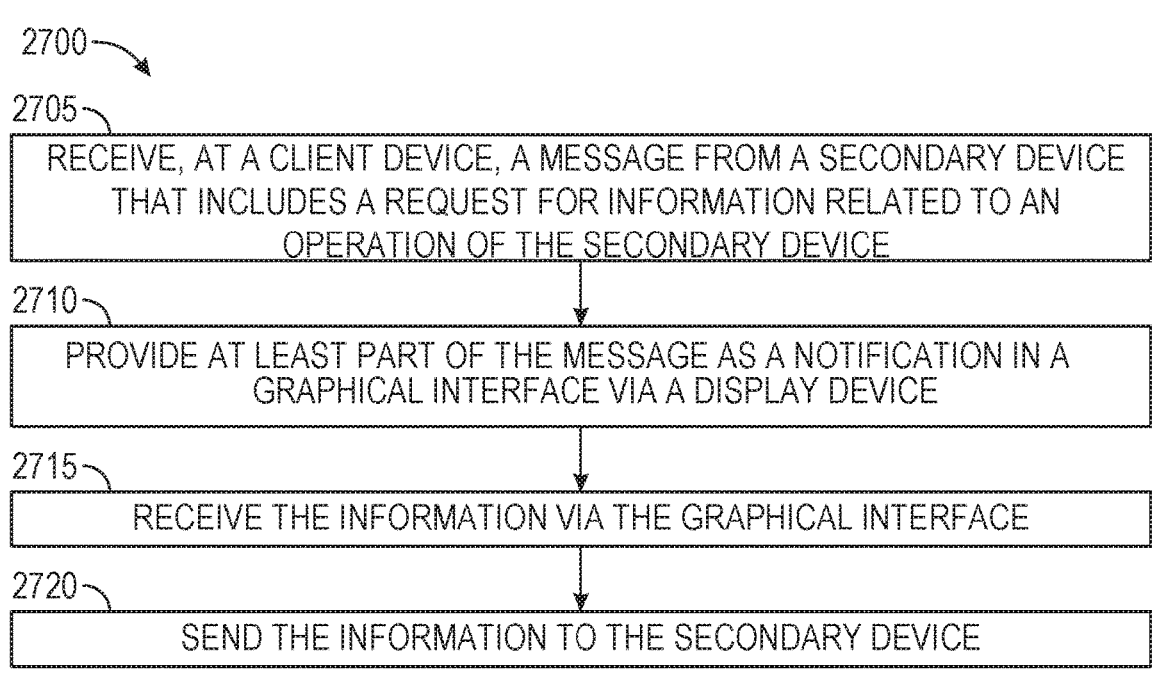
FIG. 27 illustrates an example flow diagram of a method for a client device to receive messages from a secondary device.

FIGS. 26-27 illustrate flow diagrams of various methods related to device control using interactive notifications. The methods may be performed by processing logic that may include hardware (circuitry, dedicated logic, etc.), software (such as is run on a general-purpose computer system or a dedicated machine), or a combination of both, which processing logic may be included in the television 1305, the STB 1310, the client device 1330, the content server 1325, the account server 1320, the client device 1345, the parent device 1350, the authorization server 145, the parent device 120, the child device 105, the content server 135, or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term "article of manufacture," as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 26 illustrates an example flow diagram of a method 2600 for a secondary device (e.g., a set-top box) to send and receive messages to and from a client device that may be implemented in the operating environment of FIG. 13, arranged in accordance with at least one embodiment described in the present disclosure.

The method 2600 may begin at block 2605, where processing logic may associate a client device with a secondary device. Associating the client device with the secondary device may include adding the secondary device and the client device to a user account. In at least some embodiments, associating the client device with the secondary device includes searching for available devices on a network, discovering one or both of the secondary device and client device on the network, and associating the secondary device and client device in response to discovering the one or both of the secondary device and the client device on the network. In at least some embodiments, associating the client device with the secondary device may include receiving a selection or confirmation of the client device being associated with the secondary device. In some example embodiments, the secondary device is associated with a second user account (e.g., a child account) and the client device is associated with a first user account (e.g., a parent account).

At block 2610, the processing logic may identify a triggering event related to an operation of the secondary device. In at least some embodiments, identifying the triggering event related to the operation of the secondary device may include receiving, at the secondary device, input to perform the operation. The triggering event related to the operation of the secondary device may include a time-based event, a user status-based event, a client device location-based event, or a user-initiated event. In at least some embodiments, identifying the triggering event related to the operation of the secondary device includes providing, on the secondary device, a selectable on-screen button to use a keyboard on the client device to provide information to the secondary device, and receiving an activation of the selectable on-screen button to use the keyboard on the client device to provide the information to the secondary device.

At block 2615, the processing logic may send a message to the client device with a request for information related to the operation of the secondary device in response to identifying the triggering event. The client device may have a user interface configured to receive the information. In at least some embodiments, sending the message to the client device may include determining where to send the message to the client device by identifying that the client device is connected to the same network as the secondary device or querying a user account for associated devices to identify the client device. The message may include an instruction for the client device to provide an interactive notification via the user interface. The interactive notification may include at least one of an application name, an icon, an image associated with the operation of the secondary device, identifying information for an account associated with the secondary device, and identifying information for a media content item requested to be played by the secondary device.

At block 2620, the processing logic may receive the information from the client device. The information may include at least one of an alphanumeric input, a selection of a media item, a scroll, a rewind, a fast forward, a pause, a stop, or a play. In at least some embodiments, receiving the information from the client device may include presenting the information from the client device in a secondary device interface. In at least some embodiments, the information from the client device may be presented in the secondary device interface and the user interface at the client device at substantially a same time. The information received from the client device may include an approval to play a requested media content item, a denial of authorization to play a media content item, identification of another content item to be played in place of the requested media content item, identification of a delay before allowing play of the media content item, or any suitable combination thereof.

At block 2625, the processing logic may perform the operation at the secondary device using the information from the client device. In at least some embodiments, performing the operation at the secondary device using the information from the client device may include at least one of: entering alphanumeric input in a secondary device interface, selecting a media item in the secondary device interface, scrolling in the secondary device interface, rewinding the media item, fast forwarding the media item, pausing the media item, stopping the media item, or playing the media item.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

FIG. 27 illustrates an example flow diagram of a method 2700 for a client device to receive messages from a secondary device (e.g., a set-top box) that may be implemented in the operating environment of FIG. 13, arranged in accordance with at least one embodiment described in the present disclosure.

The method 2700 begins at block 2705, where processing logic receives, at a client device, a message from a secondary device that includes a request for information related to an operation of the secondary device. In at least some embodiments, receiving the message may include receiving an instruction to open an application or a media card associated with the notification. The request may be a request to authorize play of a media content item.

At block 2710, the processing logic may provide at least part of the message as a notification in a graphical interface via a display device. In at least some embodiments, providing at least part of the message as the notification in the graphical interface via the display device may include providing an option to play a media item at the secondary device when the client device and the secondary device are connected to a network (e.g., the network 1355 of FIG. 13).

At block 2715, the processing logic may receive the information via the graphical interface. In at least some embodiments, the information may include at least one of an alphanumeric input, a selection of a media item, a scroll, a rewind, a fast forward, a pause, a stop, or a play. At block 2720, the processing logic may send the information to the secondary device to perform the secondary device operation.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Figure 28:
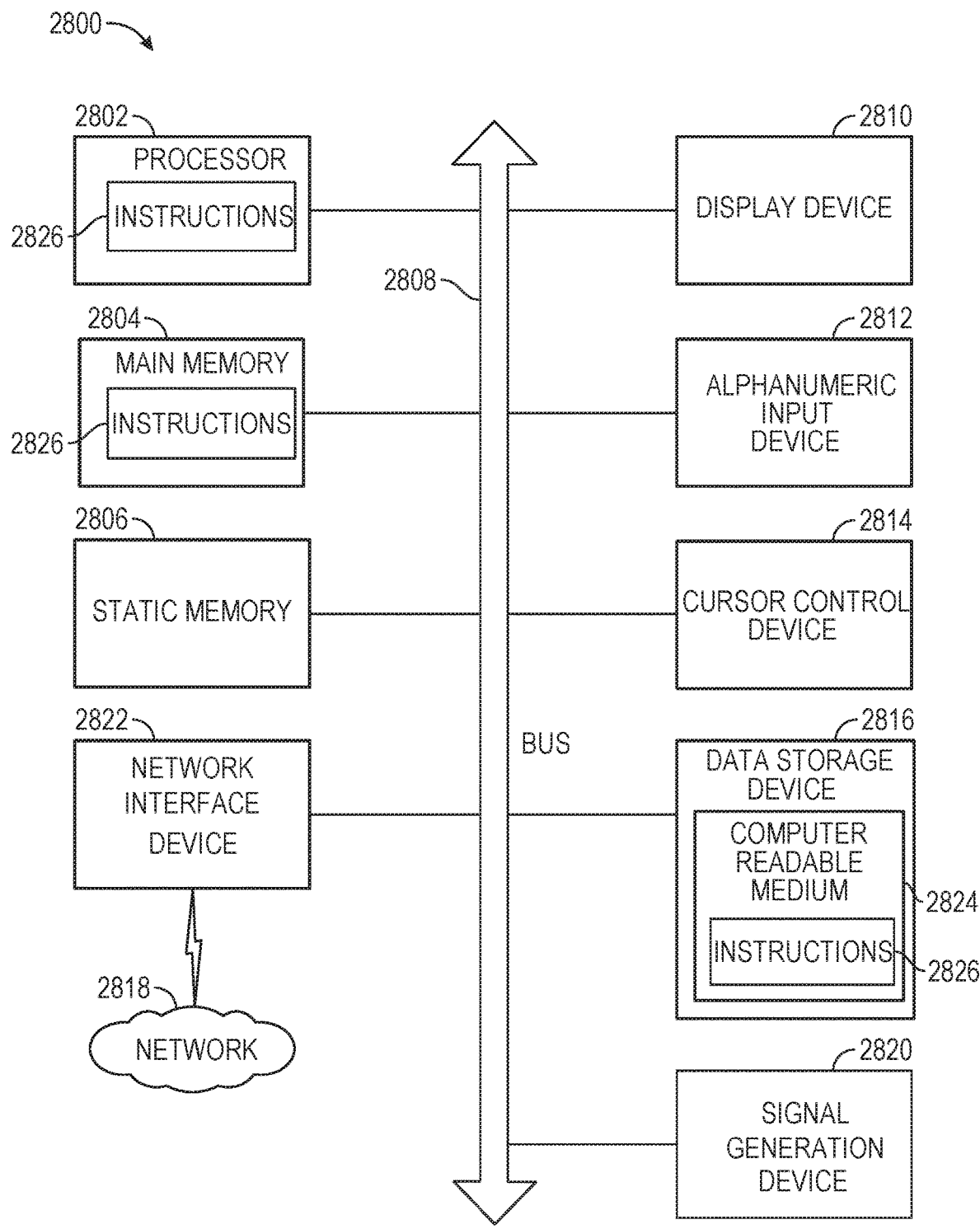
FIG. 28 illustrates a diagrammatic representation of a machine in an example form of a computing device within which a set of instructions, for causing the machine to perform any one or more of the methods discussed herein, may be executed.

FIG. 28 illustrates a diagrammatic representation of a machine in the example form of a computing device 2800 within which a set of instructions, for causing the machine to perform any one or more of the methods discussed herein, may be executed. The computing device 2800 may include a mobile phone, a smart phone, a netbook computer, a rackmount server, a router computer, a server computer, a personal computer, a mainframe computer, a laptop computer, a tablet computer, a desktop computer, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, a network switch, a network bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 2800 includes a processing device (e.g., a processor) 2802, a main memory 2804 (e.g., read-only memory (ROM), flash memory, dynamic random access memory (DRAM) such as synchronous DRAM (SDRAM)), a static memory 2806 (e.g., flash memory, static random access memory (SRAM)), and a data storage device 2816, which communicate with each other via a bus 2808.

The processing device 2802 represents one or more general-purpose processing devices such as a microprocessor, central processing unit, or the like. More particularly, the processing device 2802 may include a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 2802 may also include one or more special-purpose processing devices such as an application specific integrated circuit (ASIC), a field programmable gate array (FPGA), a digital signal processor (DSP), a network processor, or the like. The processing device 2802 is configured to execute instructions 2826 for performing the operations and steps discussed herein.

The computing device 2800 may further include a network interface device 2822 which may communicate with a network 2818. The computing device 2800 also may include a display device 2810 (e.g., a liquid crystal display (LCD) or a cathode ray tube (CRT)), an alphanumeric input device 2812 (e.g., a keyboard), a cursor control device 2814 (e.g., a mouse), and a signal generation device 2820 (e.g., a speaker). In one implementation, the display device 2810, the alphanumeric input device 2812, and the cursor control device 2814 may be combined into a single component or device (e.g., an LCD touch screen).

The data storage device 2816 may include a computer-readable storage medium 2824 on which is stored one or more sets of instructions 2826 embodying any one or more of the methods or functions described herein. The instructions 2826 may also reside, completely or at least partially, within the main memory 2804 and/or within the processing device 2802 during execution thereof by the computing device 2800, the main memory 2804 and the processing device 2802 also constituting computer-readable media. The instructions 2826 may further be transmitted or received over the network 2818 via the network interface device 2822.

While the computer-readable storage medium 2824 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding, or carrying a set of instructions for execution by the machine and that cause the machine to perform any one or more of the methods of the present disclosure. The term "computer-readable storage medium" may accordingly be taken to include, but not be limited to, solid-state memories, optical media, and magnetic media.

Figure 29:
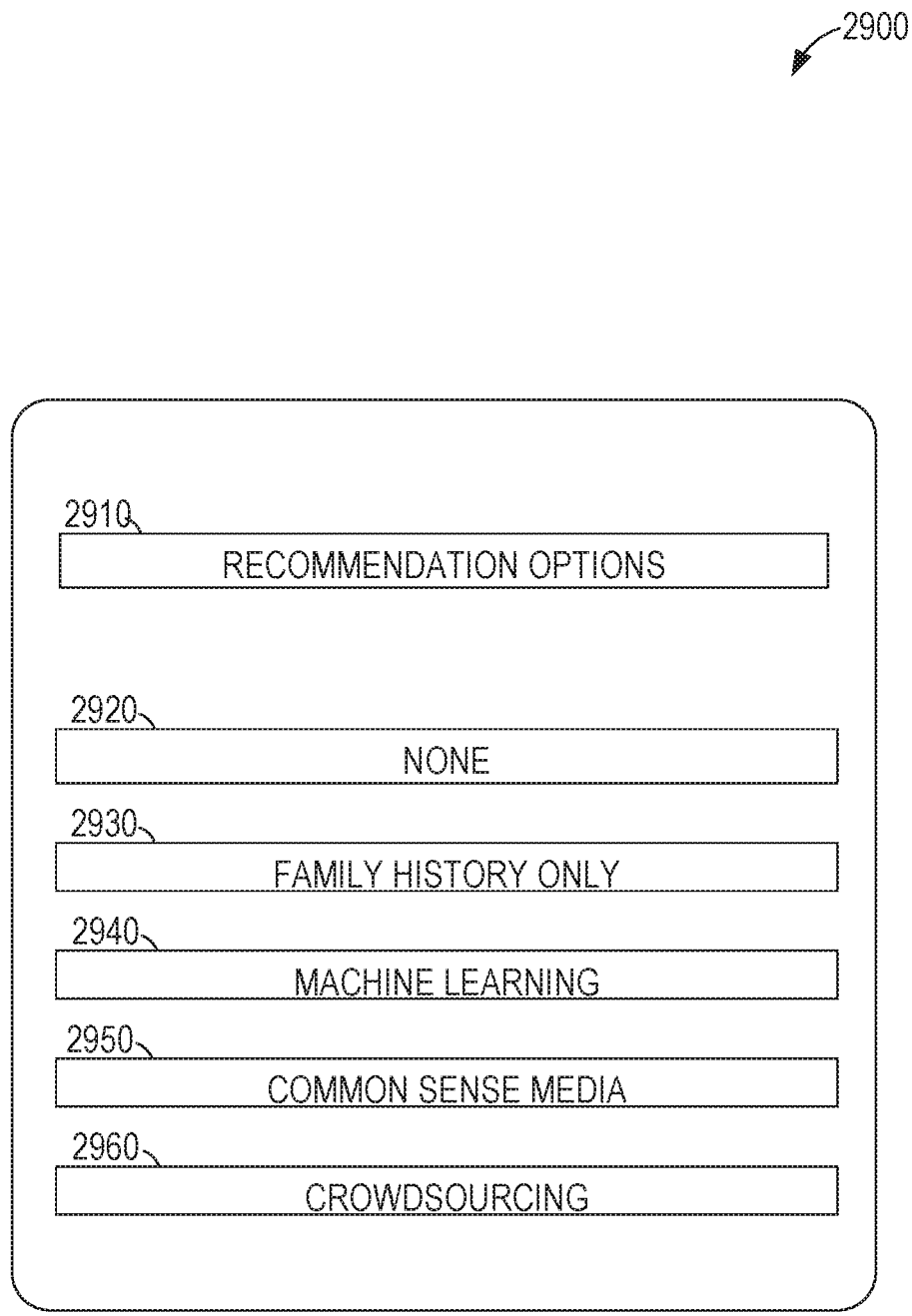
FIG. 29 is a user interface diagram illustrating a user interface suitable for selecting a recommendation source for parental controls, according to some example embodiments.

FIG. 29 is a user interface diagram illustrating a UI 2900 suitable for selecting a recommendation source for parental controls, according to some example embodiments. The UI 2900 includes a title 2910 and buttons 2940, 2930, 2940, 2950, and 2960. The UI 2900 may be presented in response to operation of the selectable option 555 of FIG. 5. The title 2910 indicates that the UI 2900 is for the setting of recommendation options.

Each of the buttons 2920-2960 is operable to select a source for recommendations. In some example embodiments, operation of one of the buttons 2920-2960 causes the source to be selected and the UI 2900 to be closed (e.g., returning the user to the UI 500 or another UI). In other example embodiments, the buttons 2920-2960 are replaced with other interface elements, such as checkboxes, and multiple sources can be selected. When multiple sources are selected, the resulting recommendation may be a weighted combination of the recommendations generated from each individual source.

The button 2920 is operable to disable recommendations. Thus, after selection of the button 2920, no recommendations will be presented. The button 2930 is operable to cause recommendations to be based solely on the previous authorizations and denials of the parent account. The button 2940 is operable to cause recommendations to be based on machine learning results trained on all accounts. The button 2950 is operable to cause recommendations to be based on third-party data obtained from Common Sense Media. The button 2960 is operable to cause recommendations to be based on third-party data obtained from crowd sourcing.

In one aspect, a method includes associating a client device with a secondary device. The method further includes identifying a triggering event related to an operation of the secondary device. The method further includes sending a message to the client device with a request for information related to the operation of the secondary device in response to identifying the triggering event. The client device may have a user interface configured to receive the information. The method further includes receiving, via a network, the information from the client device. The method further includes performing the operation at the secondary device using the information from the client device.

Associating the client device with the secondary device can include adding the secondary device and the client device to a user account. Associating the client device with the secondary device can include searching for available devices on the network. The method can further include discovering one or both of the secondary device and the client device on the network. The method can further include associating the secondary device and the client device in response to discovering the one or both of the secondary device and the client device on the network. Associating the client device with the secondary device can include receiving a selection or confirmation of the client device being associated with the secondary device. Identifying the triggering event related to the operation of the secondary device can include receiving, at the secondary device, input to perform the operation. The triggering event related to the operation of the secondary device can include a time-based event, a user status-based event, or a client device location-based event. Identifying the triggering event related to the operation of the secondary device can include providing, on the secondary device, a selectable on-screen button to use a keyboard on the client device to provide the information to the secondary device. The method can further include receiving an activation of the selectable on-screen button to use the keyboard on the client device to provide the information to the secondary device. Sending the message to the client device can include determining where to send the message to the client device by identifying that the client device is connected to the same network as the secondary device or querying a user account for associated devices to identify the client device. The message can include an instruction for the client device to provide an interactive notification via the user interface. The interactive notification can include at least one of an application name, an icon, and an image associated with the operation of the secondary device. The information can include at least one of an alphanumeric input, a selection of a media item, a scroll, a rewind, a fast forward, a pause, a stop, or a play. Performing the operation at the secondary device using the information from the client device can include at least one of entering alphanumeric input in a secondary device interface, selecting a media item in the secondary device interface, scrolling in the secondary device interface, rewinding the media item, fast forwarding the media item, pausing the media item, stopping the media item, or playing the media item. Receiving, via the network, the information from the client device can include presenting the information from the client device in the secondary device interface. The information from the client device can be presented in the secondary device interface and the user interface at the client device at substantially a same time.

In one aspect, a method includes receiving, at a client device, a message from a secondary device that includes a request for information related to an operation of the secondary device. The method further includes providing at least part of the message as a notification in a graphical interface via a display device. The method further includes receiving the information via the graphical interface. The method further includes sending, via a network, the information to the secondary device to perform the secondary device operation.

Receiving the information via the graphical interface pertaining to the notification can include receiving an instruction to open an application or a media card associated with the notification. Providing at least part of the message as the notification in the graphical interface via the display device can include providing an option to play a media item at the secondary device when the client device and the secondary device can be connected to the network. The information can include at least one of an alphanumeric input, a selection of a media item, a scroll, a rewind, a fast forward, a pause, a stop, or a play.

In one aspect, a non-transitory computer-readable medium has encoded therein programming code executable by a processor to perform or control performance of operations comprising any of the operations described above.

In one aspect, a system includes a memory and a processing device operatively coupled to the memory, the processing device being configured to perform or control performance of operations comprising any of the operations described above.

In one aspect, a non-transitory computer-readable medium has encoded therein programming code executable by a processor to perform or control performance of operations to identify a triggering event related to an operation of a secondary device. The programming code is executable by the processor to perform or control performance of operations to identify a client device associated with the secondary device. The programming code is executable by the processor to perform or control performance of operations to send a message to the client device with a request for information related to the operation of the secondary device in response to identifying the triggering event. The client device may have a user interface configured to receive the information. The programming code is executable by the processor to perform or control performance of operations to receive, via a network, the information from the client device. The programming code is executable by the processor to perform or control performance of operations to perform the operation at the secondary device using the information from the client device.

Identifying the triggering event related to the operation of the secondary device can include receiving, at the secondary device, input to perform the operation. Performing the operation at the secondary device using the information from the client device can include at least one of entering alphanumeric input in a secondary device interface, selecting a media item in the secondary device interface, scrolling in the secondary device interface, rewinding the media item, fast forwarding the media item, pausing the media item, stopping the media item, or playing the media item.

Terms used herein and especially in the appended claims (e.g., bodies of the appended claims) are generally intended as "open" terms (e.g., the term "including" may be interpreted as "including, but not limited to," the term "having"

may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such an introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such a recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, some of the terms, or all of the terms. For example, the phrase "A or B" may be understood to include the possibilities of "A" or "B" or "A and B."

Embodiments described herein may be implemented using computer-readable media for carrying or having stored thereon computer-executable instructions or data structures. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid-state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., separate threads). While some of the system and methods described herein are generally described as being implemented in software (stored on and/or executed by general-purpose hardware), specific hardware implementations or a combination of software and specific hardware implementations are also possible and contemplated.

All examples and conditional language recited herein are intended as pedagogical objects to aid the reader in understanding the inventive subject matter and the concepts contributed by the inventor to furthering the art, and are to be construed as being without limitation to such specifically recited examples and conditions. Although embodiments of the present disclosure have been described in detail, it may be understood that various changes, substitutions, and alterations may be made thereto without departing from the spirit and scope of the present disclosure.

What is claimed is:

1. A method comprising:

receiving, via a network and by one or more hardware processors, a request initiated by a first device via a first user interface for a first account to access a media content item;

accessing, by the one or more hardware processors, a recommended response to the request, wherein the recommended response is based on at least one attribute of the media content item and based on at least one prior response provided by a second account in response to one or more prior authorization requests, wherein the second account is associated with the first account, and wherein the recommended response comprises one of a recommendation to authorize access and a recommendation to deny access for the first account to the media content item;

causing, by the one or more hardware processors, presentation of a second user interface on a second device associated with the second account, the second user interface comprising an identification of the first account and a plurality of selectable options corresponding to responses to the request, the plurality of selectable options comprising a recommended selectable option corresponding to the recommended response, the recommended selectable option being visually altered based on the recommended selectable option corresponding to the recommended response;

receiving, by the one or more hardware processors, a selected response, wherein the selected response is based on an interaction with at least one selectable option via the second user interface; and based on the selected response corresponding to authorization of access, sending, by the one or more hardware processors and via the network, authorization for the media content item to be accessed on the first device by the first account.

2. The method of claim 1, further comprising:
receiving, via a fourth user interface, a second request to play a second media content item for the first account;
accessing, by the one or more hardware processors, a second recommended response to the second request, wherein the second recommended response is based on at least one attribute of the media content item and based on at least one prior response provided by the second account in response to one or more prior authorization requests, and wherein the second recommended response comprises a recommendation to deny access for the first account to the second media content item;
causing, by the one or more hardware processors, presentation of a fifth user interface on the second device, the fifth user interface comprising the identification of the first account, the second recommended response, and at least one selectable option corresponding to the second recommended response;
receiving, by the one or more hardware processors, a second selected response, wherein the second selected response is based on an interaction with at least one selectable option via the fifth user interface; and
based on the second selected response corresponding to denial of access, causing, via the network, presentation of a sixth user interface for the first account on the first device, the sixth user interface comprising a notification of denial of authorization for the second media content item to be accessed on the first device by the first account.

3. The method of claim 1, further comprising:
accessing a profile of the first account;
determining a set of other accounts based on the profile of the first account;
accessing second prior responses to approve play of the media content item for one or more accounts of the set of other accounts; and
generating the recommended response to the request based on the second prior responses.

4. The method of claim 3, wherein:
a first age is associated with the first account;
each account of the set of other accounts is associated with an age for the account; and
the determining of the set of other accounts is based on the age for the first account and the age for each account of the set of other accounts.

5. The method of claim 1, wherein:
the first device is a set top box; and
the second device is a mobile device.

6. The method of claim 1, wherein the one or more hardware processors are included in a third device.

7. The method of claim 1, wherein:
the authorization comprises an authorization to play the media content item after a delay; and
the causing of the media content item to be played on the first device occurs after the delay.

8. The method of claim 1, further comprising:
determining a plurality of media content items based on the media content item, each media content item of the plurality of media content items having been previously requested for approval by the second account;
wherein the recommended response is based on the at least one prior response provided by the second account to the requests for approval for the media content items of the plurality of media content items.

9. The method of claim 8, wherein:
the media content item and each media content item of the plurality of media content items has a corresponding content rating; and
the determining of the plurality of media content items is based on the content rating of the media content item and the content rating of each media content item of the plurality of media content items.

10. The method of claim 8, wherein:
the media content item and each media content item of the plurality of media content items has a corresponding set of actors; and
the determining of the plurality of media content items is based on the set of actors of the media content item and the set of actors of each media content item of the plurality of media content items.

11. The method of claim 8, wherein:
the media content item and each media content item of the plurality of media content items has a corresponding genre; and
the determining of the plurality of media content items based on the genre of the media content item and the genre of each media content item of the plurality of media content items.

12. The method of claim 1, wherein:
the causing of the second user interface to be presented on the second device comprises causing the second device to provide an interactive notification that includes at least one of: an application name, an icon, an image associated with the first device, and a title of the media content item.

13. The method of claim 1, wherein:
the second user interface includes information about a person near the first device, the person not being associated with the first account; and
the recommended response to the request is further based on the person.

14. The method of claim 1, further comprising:
training a machine learning system using the at least one prior response provided by the second account; and
generating the recommended response to the request based on an output from the machine learning system.

15. The method of claim 1, further comprising:
receiving, via a fourth user interface, a second request to play a second media content item; and
based on a setting of the second account, the second media content item, and a current time, causing the second media content item to be played on the first device.

16. The method of claim 1, wherein:
the second user interface comprises an option to play a preview of the media content item; and
the method further comprises:
in response to an activation of the option, causing the preview of the media content item to play on the second device.

17. The method of claim 1, wherein:
the first account is associated with a quantity of media consumption; and
the recommended response is based on the quantity of media consumption.

18. The method of claim 1, further comprising:
receiving, via a fourth user interface, a second request to replay the media content item; and
based on the authorization and the second request, causing the media content item to be replayed on the first device.

19. A system comprising:
one or more processors; and
a memory accessible to the one or more processors, the memory storing instructions which are executable by the one or more processors to cause the one or more processors to perform operations comprising:
receiving, via a network, a request initiated by a first device via a first user interface for a first account to access a media content item;
accessing a recommended response to the request, wherein the recommended response is based on at least one attribute of the media content item and based on at least one prior response provided by a second account in response to one or more prior authorization requests, wherein the second account is associated with the first account, and wherein the recommended response comprises one of a recommendation to authorize access and a recommendation to deny access for the first account to the media content item;
causing presentation of a second user interface on a second device associated with the second account; the second user interface comprising an identification of the first account and a plurality of selectable options corresponding to responses to the request, the plurality of selectable options comprising a recommended selectable option corresponding to the recommended response, the recommended selectable option being visually altered based on the recommended selectable option corresponding to the recommended response;
receiving a selected response; wherein the selected response is based on an interaction with at least one selectable option via the second user interface;
based on the selected response corresponding to authorization of access, sending, via the network, authorization for the media content item to be accessed on the first device by the first account; and
based on the selected response corresponding to denial of access, causing, via the network, presentation of a third user interface for the first account on the first device, the third user interface comprising a notification of denial of authorization for the media content item to be accessed on the first device by the first account.

20. A non-transitory machine-readable medium that stores instructions that, when executed by one or more processors, cause the one or more processors to perform operations comprising:
receiving, via a network, a request initiated by a first device via a first user interface for a first account to access a media content item;
accessing a recommended response to the request, wherein the recommended response is based on at least one attribute of the media content item and based on at least one prior response provided by a second account in response to one or more prior authorization requests, wherein the second account is associated with the first account, and wherein the recommended response comprises one of a recommendation to authorize access and a recommendation to deny access for the first account to the media content item;
causing presentation of a second user interface on a second device associated with the second account, the second user interface comprising an identification of the first account and a plurality of selectable options corresponding to responses to the request, the plurality of selectable options comprising a recommended selectable option corresponding to the recommended response, the recommended selectable option being visually altered based on the recommended selectable option corresponding to the recommended response;
receiving a selected response, wherein the selected response is based on an interaction with at least one selectable option via the second user interface;
based on the selected response corresponding to authorization of access, sending, via the network, authorization for the media content item to be accessed on the first device by the first account; and
based on the selected response corresponding to denial of access, causing, via the network, presentation of a third user interface for the first account on the first device, the third user interface comprising a notification of denial of authorization for the media content item to be accessed on the first device by the first account.

* * * * *

UNITED STATES PATENT AND TRADEMARK OFFICE
CERTIFICATE OF CORRECTION

PATENT NO. : 10,743,081 B2
APPLICATION NO. : 16/125367
DATED : August 11, 2020
INVENTOR(S) : Grumer et al.

Page 1 of 1

It is certified that error appears in the above-identified patent and that said Letters Patent is hereby corrected as shown below:

In the Claims

In Column 41, Line 23, in Claim 19, delete "account;" and insert --account,-- therefor In Column 41, Line 33, in Claim 19, delete "response;" and insert --response,-- therefor Signed and Sealed this
Twenty-seventh Day of October, 2020

Andrei Iancu
*Director of the United States Patent and Trademark Office*